(12) United States Patent
Nicholson et al.

(10) Patent No.: US 12,264,016 B2
(45) Date of Patent: Apr. 1, 2025

(54) AUTOMATED REPITCH SYSTEM AND RELATED METHODS

(71) Applicant: ATS Corporation, Cambridge (CA)

(72) Inventors: Kenneth Wayne Nicholson, Cambridge (CA); David Andrew Tait, Cambridge (CA); Robert James MacGregor, Cambridge (CA)

(73) Assignee: ATS Corporation, Cambridge (CA)

( * ) Notice: Subject to any disclaimer, the term of this patent is extended or adjusted under 35 U.S.C. 154(b) by 185 days.

(21) Appl. No.: 17/903,808

(22) Filed: Sep. 6, 2022

(65) Prior Publication Data

US 2023/0083483 A1    Mar. 16, 2023

Related U.S. Application Data

(60) Provisional application No. 63/242,758, filed on Sep. 10, 2021.

(51) Int. Cl.
| | |
|---|---|
| *B65G 47/24* | (2006.01) |
| *B25J 15/00* | (2006.01) |
| *B65G 47/248* | (2006.01) |
| *B65G 47/90* | (2006.01) |

(52) U.S. Cl.
CPC ........ *B65G 47/248* (2013.01); *B25J 15/0052* (2013.01); *B65G 47/905* (2013.01)

(58) Field of Classification Search
CPC ..... B65G 47/24; B65G 47/248; B65G 47/905
USPC ....................................................... 198/435
See application file for complete search history.

(56) References Cited

U.S. PATENT DOCUMENTS

| | | | |
|---|---|---|---|
| 4,901,504 A | 2/1990 | Tsuji et al. | |
| 5,437,361 A * | 8/1995 | Ohmori | B67B 3/062 198/465.1 |
| 6,068,317 A | 5/2000 | Park | |
| 6,733,224 B1 * | 5/2004 | Linner | B65B 43/46 294/93 |
| 8,549,818 B2 * | 10/2013 | Ehrat | B65B 35/36 53/251 |

(Continued)

FOREIGN PATENT DOCUMENTS

EP    2192063 A1    6/2010

OTHER PUBLICATIONS

US 2021/0407837 A1, Hudgens, Dec. 30, 2021.*

(Continued)

*Primary Examiner* — Douglas A Hess
(74) *Attorney, Agent, or Firm* — Valauskas Corder LLC

(57) ABSTRACT

A method of repitching workpieces in an automated mass production system includes: (a) unloading a set of workpieces from a plurality of first retainers arranged at a first pitch, the unloading step including gripping of the workpieces by corresponding grippers of a repitch robot; (b) adjusting the workpieces from the first pitch to a second pitch different from the first pitch, the adjusting step including translating the grippers relative to each other from a first spacing corresponding to the first pitch to a second spacing corresponding to the second pitch; and (c) loading the workpieces into a plurality of corresponding second retainers arranged at the second pitch, the loading step including positioning and releasing the workpieces in the second retainers via the grippers.

18 Claims, 15 Drawing Sheets

(56) References Cited

U.S. PATENT DOCUMENTS

| | | | |
|---|---|---|---|
| 8,876,182 B2* | 11/2014 | Eidelberg | B66C 1/00 294/87.1 |
| 9,365,366 B2* | 6/2016 | Girtman | B65G 47/918 |
| 9,540,127 B2* | 1/2017 | Papsdorf | B65G 47/082 |
| 9,586,325 B2* | 3/2017 | Truyens | B65G 47/918 |
| 9,904,281 B2 | 2/2018 | Nicholson et al. | |
| 10,018,985 B2 | 6/2018 | Nicholson et al. | |
| 10,604,291 B2* | 3/2020 | Hutter | B65B 35/36 |
| 11,142,354 B2* | 10/2021 | Veile | B65B 61/28 |
| 2012/0090276 A1 | 4/2012 | Monti | |
| 2014/0271084 A1 | 9/2014 | Vangilbergen et al. | |
| 2016/0137326 A1 | 5/2016 | Hutter et al. | |
| 2017/0197745 A1 | 7/2017 | Deutschle et al. | |
| 2017/0203865 A1 | 7/2017 | Kalany et al. | |
| 2022/0009723 A1 | 1/2022 | Schuesslburner | |

OTHER PUBLICATIONS

US 2024/0059500 A1, Dekocker et al., Feb. 22 (Year: 2024).*
Extended European Search Report, European Patent Office (Munich, Germany), Feb. 8, 2023.

* cited by examiner

AUTOMATED REPITCH SYSTEM AND RELATED METHODS

CROSS-REFERENCE TO RELATED APPLICATIONS

This application claims the benefit of U.S. Provisional Patent Application No. 63/242,758 filed Sep. 10, 2021, which is hereby incorporated herein by reference in its entirety.

FIELD

The specification relates generally to automated mass production, and more specifically, to repitching workpieces in an automated mass production process.

BACKGROUND

U.S. Pat. No. 9,904,281 (Nicholson et al.) discloses an automated method of assembling or processing components using computer numerical controlled drives to decouple the stages of delivering components to a tool, into a series of separately programmable stages, namely, a component loading stage, a component separating stage, an accelerating stage, and a delivery stage, wherein the timing, position, speed, velocity, and acceleration of each component during each stage is selected through programming of the computer numerical controls.

U.S. Pat. No. 10,018,985 (Nicholson et al.) discloses a device, system and method of automated manufacture comprising: delivering a workpiece with a delivery device; receiving the workpiece with a receiving device, the delivering of the workpiece and the receiving of the workpiece being electronically synchronized; processing the workpiece with a processing tool while the workpiece is on the receiving device; transferring the workpiece to a completion device, the ejection of the workpiece and the transferring of the workpiece being electronically synchronized. In particular the workpiece may comprise: a platform with mounts supporting a first component in a selected orientation; and a locating surface, the method comprising: engaging and disengaging the locating surface of the workpiece with releasable connectors on the delivery device, on the receiving device and on the completion device.

SUMMARY

The following summary is intended to introduce the reader to various aspects of the applicant's teaching, but not to define any invention.

According to some aspects, a method of repitching workpieces in an automated mass production system, comprising: (a) receiving a supply carrier at a workpiece repitch station, the supply carrier including at least one row of supply retainers, the supply retainers positioned along each row at regular intervals defined by a first pitch, and each supply retainer holding a corresponding workpiece for unloading at the repitch station; (b) receiving a processing carrier at the repitch station, the processing carrier including at least one row of processing retainers for receiving corresponding workpieces, the processing retainers positioned along each row at regular intervals defined by a second pitch, the second pitch different from the first pitch; (c) transferring a set of workpieces from adjacent supply retainers in a corresponding row of the supply carrier to corresponding repitch grippers of a repitch robot at the repitch station; (d) transferring the set of workpieces from the repitch grippers to adjacent processing retainers in a corresponding row of the processing carrier; and (e), after (c) and prior to (d): moving the repitch grippers from a pick-up position adjacent the supply carrier to a drop-off position adjacent the processing carrier, and translating the repitch grippers relative to each other from a pick-up configuration, in which adjacent repitch grippers are spaced apart from each other by a first spacing, to a drop-off configuration, in which adjacent repitch grippers are spaced apart from each other by a second spacing, the first spacing corresponding to the first pitch for alignment of the repitch grippers in the pick-up position with corresponding supply retainers to facilitate the transferring in (c), and the second spacing corresponding to the second pitch for alignment of the repitch grippers in the drop-off position with corresponding processing retainers to facilitate the transferring in (d).

In some examples, the translating in (e) is performed during the moving in (e).

In some examples, the method further includes, after the transferring in (d): (f) moving the repitch grippers from the drop-off position to the pick-up position, and translating the repitch grippers relative to each other from the drop-off configuration to the pick-up configuration in preparation for step (c) of a subsequent repitch cycle. In some examples, the translating in (f) is performed during the moving in (f).

In some examples, the method further includes continuously repeating steps (c) to (f) in successive repitch cycles for subsequent sets of workpieces, supply retainers, and processing retainers.

In some examples, during (c) in an initial cycle, the set of supply retainers are in alignment with the pick-up position of the repitch grippers, and the method further comprises, after (c) in the initial cycle, indexing the supply carrier to position a subsequent set of supply retainers in alignment with the pick-up position of the repitch grippers.

In some examples, the supply carrier is held by an end effector of a carrier handling robot at the repitch station, and the indexing step includes moving the end effector along an indexing axis to translate the supply carrier therealong.

In some examples, during (c) in an initial plurality of cycles, the pick-up position is adjacent an initial row of supply retainers for unloading workpieces from the initial row, and after unloading the workpieces from the supply retainers in the initial row, the pick-up position is adjusted toward a subsequent row of supply retainers for unloading workpieces from the subsequent row in a subsequent plurality of cycles.

In some examples, the method further includes, after unloading all the workpieces from the supply carrier to produce an empty supply carrier, replacing the empty supply carrier with a full supply carrier for subsequent cycles.

In some examples, step (a) includes advancing the supply carrier along a supply track section passing through the repitch station, and the replacing step includes advancing the empty supply carrier along the supply track section away from the repitch station and advancing the full supply carrier along the supply track section to the repitch station.

In some examples, during (d) in an initial cycle, the set of processing retainers are in alignment with the drop-off position for the repitch grippers, and the method further comprises, after (d) in the initial cycle, indexing the processing carrier to position a subsequent set of processing retainers in alignment with the drop-off position for the repitch grippers.

In some examples, the indexing step comprises translating the processing carrier along a processing track.

In some examples, the method further includes, after transferring workpieces into each processing retainer of the processing carrier to produce a full processing carrier, replacing the full processing carrier with an empty processing carrier for subsequent cycles.

In some examples, step (b) includes advancing the processing carrier along a processing track section passing through the repitch station, and the replacing step includes advancing the full processing carrier along the processing track section away from the repitch station and advancing the empty processing carrier along the supply track section to the repitch station.

In some examples, each supply carrier has a quantity of supply retainers and each processing carrier has a quantity of processing retainers, the quantity of supply retainers at least ten times greater than the quantity of supply retainers.

In some examples, the repitch grippers are movably mounted to a common end-of-arm tooling (EOAT) platform of the repitch robot and translatable relative to each other along the EOAT platform between the first and second spacing.

In some examples, step (c) includes, prior to engagement of the set of workpieces by the repitch grippers, raising the set of workpieces relative to the supply carrier to present an upper surface of each workpiece of the set of workpieces to the repitch grippers.

In some examples, the raising step includes gripping a lower surface of each workpiece of the set of workpieces with corresponding presentation grippers of a workpiece presentation robot at the repitch station, and lowering the supply carrier relative to the set of workpieces gripped by the presentation grippers.

In some examples, step (c) includes lifting the supply carrier relative to the presentation grippers to bring the lower surface into vertical alignment with the presentation grippers, and horizontally translating the presentation grippers from a retracted position clear of the supply carrier to an advanced position for gripping of the lower surface in vertical alignment with the presentation grippers.

According to some aspects, a method of repitching workpieces in an automated mass production system includes: (a) unloading a set of workpieces from a plurality of corresponding first retainers arranged at a first pitch, the unloading step including gripping of the workpieces by corresponding grippers of a repitch robot; (b) adjusting the workpieces from the first pitch to a second pitch different from the first pitch, the adjusting step including translating the grippers relative to each other from a first spacing corresponding to the first pitch to a second spacing corresponding to the second pitch; and (c) loading the workpieces into a plurality of corresponding second retainers arranged at the second pitch, the loading step including positioning and releasing the workpieces in the second retainers via the grippers.

According to some aspects, a repitch station for an automated mass production system includes: (a) a supply track section; (b) a plurality of supply carriers advanceable along the supply track section to an unloading location, each supply carrier including at least one row of supply retainers, the supply retainers positioned along each row at regular intervals defined by a first pitch, and each supply retainer for holding a corresponding workpiece; (c) a processing track section arranged in parallel with the supply track section; (d) a plurality of processing carriers advanceable along the processing track section to a loading location, each processing carrier including at least one row of processing retainers for receiving corresponding workpieces, the processing retainers positioned along each row at regular intervals defined by a second pitch, the second pitch different from the first pitch; and (e) a repitch robot including a plurality of repitch grippers moveable together between a pick-up position adjacent the unloading location for removing a set of workpieces from adjacent supply retainers at the unloading location, and a drop-off position adjacent the loading location for placing the set of workpieces into adjacent processing retainers at the loading location, the grippers translatable relative to each other between a pick-up configuration and a drop-off configuration, and when in the pick-up configuration, the repitch grippers are spaced apart from each other by a first spacing corresponding to the first pitch for alignment of the repitch grippers in the pick-up position with corresponding supply retainers at the unloading location to facilitate removal of the set of workpieces from the supply retainers, and when in the drop-off configuration, the repitch grippers are spaced apart from each other by a second spacing corresponding to the second pitch for alignment of the repitch grippers in the drop-off position with corresponding processing retainers at the loading location to facilitate loading of the set of workpieces into the processing retainers.

In some examples, the station further includes a workpiece presentation system configured to raise the set of workpieces at the unloading location relative to the supply carrier for presentation of the set of workpieces to the repitch grippers.

In some examples, the workpiece presentation system includes a workpiece presentation robot including a plurality of presentation grippers operable to hold the set of workpieces at the unloading location in fixed vertical relation relative to the supply track section, and a carrier handling robot having an end effector operable to lift the supply carrier above the supply track section for vertical alignment of the set of workpieces with the presentation grippers for engagement therebetween, and to lower the supply carrier relative to the set of workpieces when held by the presentation grippers to raise the set of workpieces relative to the supply carrier for presentation to the repitch grippers.

In some examples, the end effector is operable to horizontally translate the supply carrier among a plurality of indexing positions, each indexing position corresponding to a respective set of supply retainers being in alignment with the pick-up position for the repitch grippers.

BRIEF DESCRIPTION OF THE DRAWINGS

The drawings included herewith are for illustrating various examples of apparatuses, systems, and processes of the present specification and are not intended to limit the scope of what is taught in any way. In the drawings.

DETAILED DESCRIPTION

Figure 1:
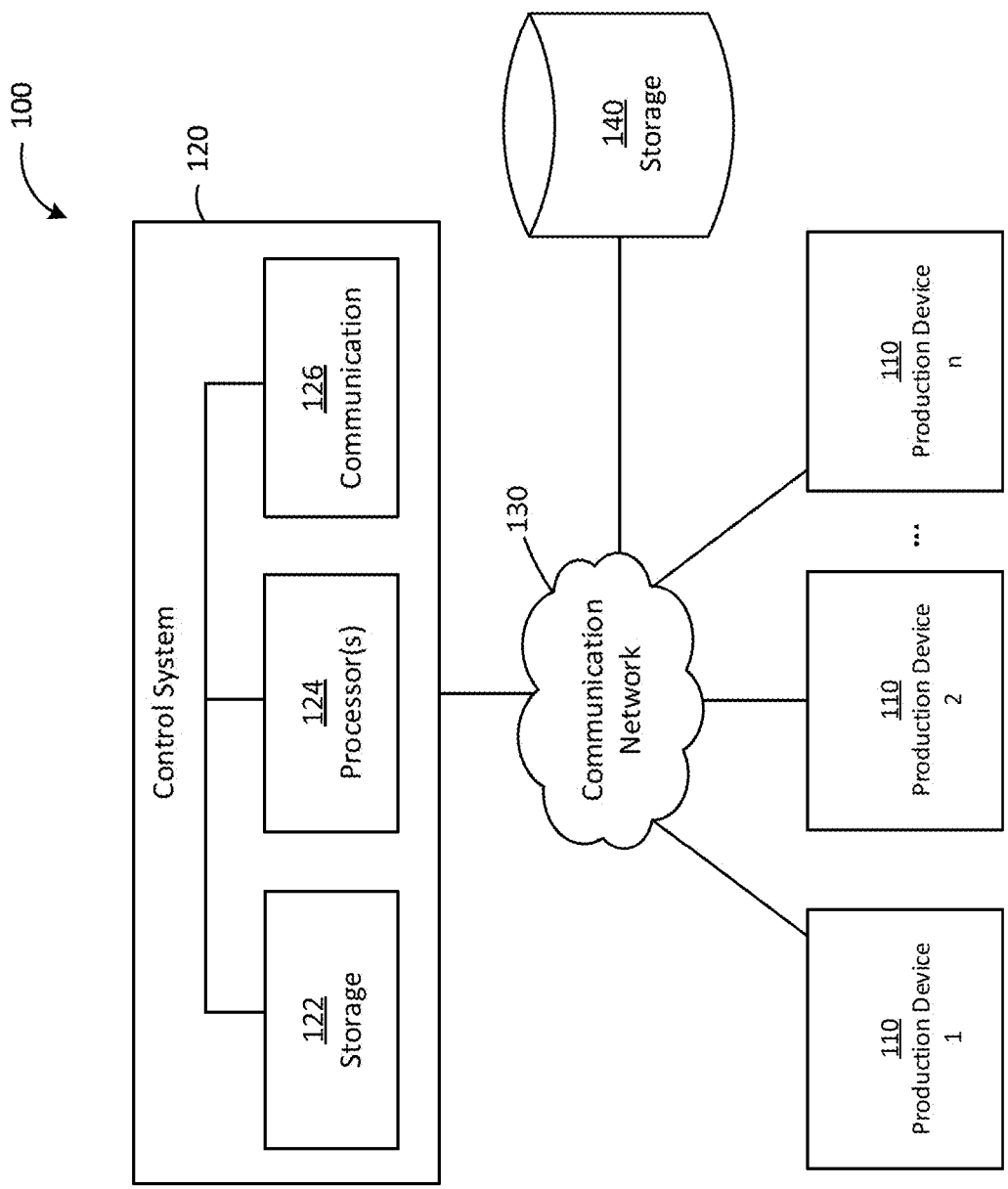
FIG. 1 is a schematic of an example automated mass production system.

Various apparatuses, systems, or processes will be described below to provide an example of an embodiment of each claimed invention. No embodiment described below limits any claimed invention and any claimed invention may cover apparatuses, systems, or processes that differ from those described below. The claimed inventions are not limited to apparatuses, systems, or processes having all of the features of any one apparatus, system, or process described below or to features common to multiple or all of the apparatuses, systems, or processes described below. It is possible that an apparatus, system, or process described below is not an embodiment of any claimed invention. Any invention disclosed in an apparatus, system, or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A production process can involve processing (e.g. feeding, indexing, transferring, repitching, assembling, transporting, validating, etc.) parts to produce a product. During the production process, the part requiring processing (for example, a subcomponent, assembly, or partially finished product) can be referred to as a workpiece. The workpiece can be moved through a production system among various production devices that operate on the workpiece(s) in production of the product.

In some applications, a mass production process may require repitching of workpieces for subsequent processing. Repitching can include changing the distance between regularly spaced workpieces. For example, a supply tray of workpieces may be arranged in a densely packed configuration for supply to the production system. The supply tray may include a plurality of rows of the workpieces, with the workpieces in each row positioned at regular intervals defined by a first pitch. The workpieces may require transfer to a processing carrier (e.g. a translatable platform) for subsequent processing (e.g. to transport the workpieces among a plurality of subsequent processing stations). The subsequent processing may require and/or benefit from having the workpieces positioned in corresponding rows at regular intervals defined by a second pitch that is different from (e.g. greater than) the first pitch (e.g. to space apart the workpieces to permit assembly of other components and/or performance of subsequent operations). According to some aspects, a repitch robot having a plurality of grippers can be provided for unloading workpieces from a corresponding row in the supply tray at the first pitch, adjusting the pitch of the workpieces from the first pitch to the second pitch, and loading the workpieces into a corresponding row in the processing carrier at the second pitch. The repitching process can be repeated automatically in a continuous mass production process. According to some aspects of the present disclosure, operation of the system components can be electronically synchronized for improved processing efficiency relative to some other systems.

Referring to FIG. 1, a schematic of an example automated production system 100 is shown. In the example illustrated, the production system 100 includes a plurality of production devices 110 for processing workpieces, a production control system 120 for controlling operation of the production devices 110 and/or other system components to facilitate a mass production process, a communication network 130 for enabling communication among system components, and a production system storage component 140 for storing relevant data for the production system 100 (e.g. operational and/or control data relating to the production devices 110 and/or other aspects of the system 100).

In the example illustrated, the control system 120 includes a control system storage component 122, one or more system processors 124, and a system communication component 126. The system processor 124 controls operation of the control system 120. In some examples, the system processor 124 and processors at the production devices 110 cooperate to control operation of the system 100 (e.g. through determination and/or processing of control parameters and generation of control signals for operation and synchronization based on the control parameters).

In some examples, the storage component 122 (e.g. memory) can store data received from the production devices 110, data for coordinating operation of the production devices 110, property data in respect of each production device 110, etc. The storage component 122 can store computer programs executable by the system processor 124 to facilitate communication among and operation of the system components.

The production system storage component 140 can be accessible via the communication network 130 and provided in addition to or in lieu of the control system storage component 122. In some examples, the control system storage component 122 can store current operating data corresponding to current operation of the control system 120 (e.g. current position, speed, velocity, and/or acceleration of production tooling), and the production system storage component 140 can store data for future use. In some examples, the storage component 140 can include third party data storage. The storage component 140 can store information about the production devices 110, including operating data, profile data (e.g., servo-motor profile data), motion data (e.g., tool motion data), part/workpiece/product data, etc. Such data can be stored in the storage component 140 for subsequent retrieval by the production devices 110 and/or control system 120, for example, through download via communication network 130.

The communication network 130 can carry data to enable communication among system components (e.g. among the control system 120, production devices 110, storage component 140, and/or other devices/components), and can be a wired and/or wireless communication network. In some examples, components of the system 100 (including, for example production devices 110 and control system 120) can include wireless communication interfaces to enable wireless communication through communication network 130.

Figure 2:
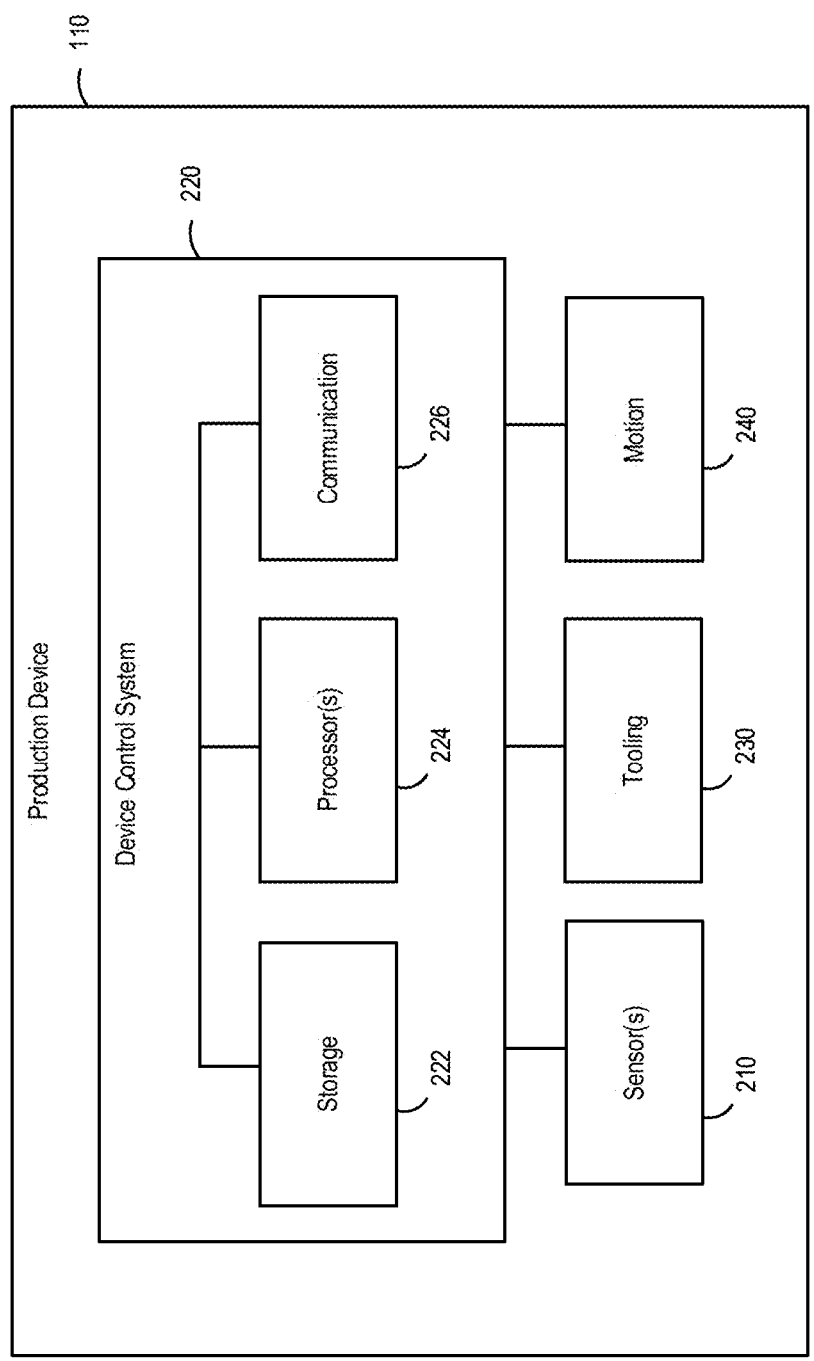
FIG. 2 is a schematic of an example production device of the system of FIG. 1.

Referring to FIG. 2, a block diagram representing an example production device 110 is shown. In the example illustrated, the production device 110 includes a device control system 220, a sensor system 210, tooling 230, and a motion system 240.

In the example illustrated, the device control system 220 includes a device processor 224, a device storage component (e.g. memory) 222, and a device communication component 226. The device control system 220 is operable to control operation of the production device 110, and can collect and store sensor, tooling, and motion data for the production device 110 in the device storage component 222 for operational use and/or for providing to the control system 120 through network 130 to facilitate electronic synchronization of production devices 110.

The device storage component 222 can store data for operation of the production device 110 and/or to facilitate electronic synchronization. Example data can include, for example, operating data, part data, tool data, motion data, sensor data, etc. The sensor system 210 can include one or more sensors (e.g. range-finding, motion, vision systems, etc.) for collecting operational and/or environmental data for facilitating the production process. Each production device 110 can be equipped with a motion system 240 for movement of the production device 110 and/or components thereof (e.g. sensors, tooling, etc.). The motion system 240 can include, for example, one or more servo-motors and/or other actuators.

The production devices 110 can be equipped with tooling 230 for engaging with and processing workpieces. Tooling 230 can be used for, for example, part handling, manipulation, transport, etc. The operation of tooling 230 can be controlled by the device control system 220 based on, for example, sensor data from the sensor system 210 and operational data for the production device 110 or other production devices 110 and/or system components.

The tooling 230 can be in the form of, for example, one or more workpiece presentation tools for presenting the workpieces at predetermined locations for delivery and/or further processing and/or one or more workpiece processing tools for performing value-added operations on the workpieces. The workpiece presentation tools can be part of, for example, one or more tracks, carriers, conveyors, screws, indexer, actuators, or other devices for, for example, separating workpieces from other workpieces and delivery of the workpieces to a processing tool for subsequent processing. In some examples, the presentation tools can be part of a carrier and configured to, for example, receive one or more workpieces, accelerate the workpieces toward a position (e.g. along a transport track) for a processing station, and present the workpieces at the processing position for processing by one or more processing tools of the station.

Processing tools can be configured to conduct one or more value-added operations on or with the workpieces. For example, the processing tools can be configured to manipulate a workpiece, assemble two or more workpieces together, reorient and/or reposition a workpiece for further processing, etc. In some examples, processing tools can include, e.g. end effectors such as grippers for part manipulation, assembly, reorientation, transfer, repitching, etc. In some examples, the processing tools can comprise grippers of a pick-and-place robot and can be configured to, for example, unload a plurality of workpieces from a first set of retainers holding the workpieces (e.g. of a supply carrier); after unloading, repitch the workpieces to change a spacing therebetween; and after repitching, load the workpieces into a second set of retainers at a different pitch for subsequent processing.

Machine-readable instructions stored in storage component 222 (or in storage 122, 140) can cause the control system 220 (and/or 120) to execute various methods disclosed herein including generation of one or more signals (e.g., output data) useful in operation of the production devices 110. Such machine-readable instructions can be incorporated into one or more computer program products which can be stored on suitable medium or media. In some embodiments, the machine-readable instructions can be executable by processor 224 and/or 124 for generation of signals useful in electronic synchronization of two or more operations carried out by the tooling 230 (e.g. by presentation and processing tools) of the production devices 110. The machine-readable instructions can be executable by the processor(s) for determination and/or selection of control parameters for operation of the tooling 230 and generate signals representative of the control parameters. For example, the machine-readable instructions can be configured to cause processor 224 and/or 124 to generate signals useful in the electronic synchronization of, for example, the delivery of workpieces by a presentation tool and receipt of the workpieces by a processing tool; the processing steps performed by one or more processing tools; and/or delivery of workpieces by the processing tool and receipt of the workpieces by the presentation tool.

The synchronization of two or more operations performed by the tooling 230 of one or more production devices 110 can utilize electronic camming (e.g. instead of mechanical cams, gears, or linkages). Electronic camming can coordinate the actuation of multiple mechanisms through electronic controls and software. The mechanisms need not physically interact and synchronization of their motions is electronically controlled with accuracy and flexibility through software interaction. Electronic camming can link movement of devices through electronic means (i.e. software), conceptually in the same manner that gears, linkages, and timing chains link movements of mechanical devices together, with enhanced accuracy, control, and design flexibility.

In various embodiments, the use of such electronic synchronization can facilitate system flexibility and improve system performance relative to some more-conventional systems utilizing mechanical synchronization means. In some examples, storage component 222 (and/or 122, 140) can hold data representative of one or more cam profiles to be used in the operation of the tooling 230 of one or more production devices 110. For example, such cam profile(s) can be in tabular form and can include corresponding positions representative of synchronized trajectories to be followed by the tooling 230 during operation. In some examples, one tooling component 230 can be operated as a master device and another tooling component 230 can be operated as a slave device executing movements based on the execution of movements by the master device in order to substantially maintain synchronization between the slave device and the master device. In some examples, the production devices 110 can include one or more master devices and one or more respective slave devices. For example, multiple slave devices can be electronically cammed with a master device.

The machine-readable instructions can be configured to cause processor 224 and/or 124 to generate signals useful in electronic synchronization (e.g. camming) of the delivery of a workpiece by a presentation tool and of receipt of the workpiece by a processing tool (or another presentation tool). In some embodiments, the machine-readable instructions can be configured to cause the processor(s) to generate signals useful in electronic synchronization of loading, separation, acceleration, and delivery of a workpiece by a presentation tool and of receipt of the workpiece by a processing tool. In some embodiments, the machine-readable instructions can be configured to cause the processor(s) to generate signals useful in controlling movement of a workpiece along a delivery trajectory and controlling movement of a processing tool along a processing tool trajectory for electronic synchronization of the workpiece and processing tool.

In some examples, the machine-readable instructions can be configured to cause processor 224 and/or 124 to generate signals useful in controlling at least some aspect of the processing of a workpiece. For example, such processing can include one or more value-added operations that can be carried out by the processing tool. Such value-added operation can include, for example, repitching of workpieces and transfer of the workpieces between carriers. The machine-readable instructions may, for example, be configured to cause processor 224 (and/or 124) to generate signals useful in electronic synchronization of the processing of a workpiece and one or more operations associated with presentation and/or processing tools. In some embodiments, the machine-readable instructions can be configured to cause the processor(s) to generate signals useful in controlling translation of a processing tool, translation of subcomponents (e.g. grippers) of the processing tool relative to each other, and/or translation and/or movement of presentation tools and/or subcomponents thereof. In some examples, one or more operations conducted by the presentation or processing tools can be under binary control rather than direct electronic synchronization. In some examples, the triggering of an operation via a binary control signal can be dependent on the position of a master device and can still be based on a cam profile. The production devices 110 can include one or more servo-motors associated with tooling components 230, and the machine-readable instructions can be configured to cause processor 224 and/or 124 to generate signals useful in controlling the servo-motors according to a predetermined cam profile to carry out electronically synchronized operations according to the methods herein.

The production devices 110 can include a numerically synchronized control architecture. For example, transfer and presentation of workpieces (e.g. by presentation tools) according to the methods disclosed herein can include a first computer numerically controlled operation and the receiving of the workpiece (e.g. by a processing tool or another presentation tool) can include a second computer numerically controlled operation. In some examples, the loading, separating, accelerating, and delivering of workpieces can include a first computer numerically controlled operation and the receiving of the workpieces can include a second computer numerically controlled operation. In some examples, the receiving of a workpiece can include a first computer numerically controlled operation and the processing of the workpiece can include a second computer numerically controlled operation. In some examples, the processing of a workpiece can include a first computer numerically controlled operation and the delivery of the workpiece can include a second computer numerically controlled operation. In some examples, the translation of a workpiece can include a first computer numerically controlled operation and the rotation of the workpiece can include a second computer numerically controlled operation. In such examples, the first computer numerically controlled operation and the second computer numerically controlled operation can be electronically synchronized (e.g. electronically cammed).

Figure 3:
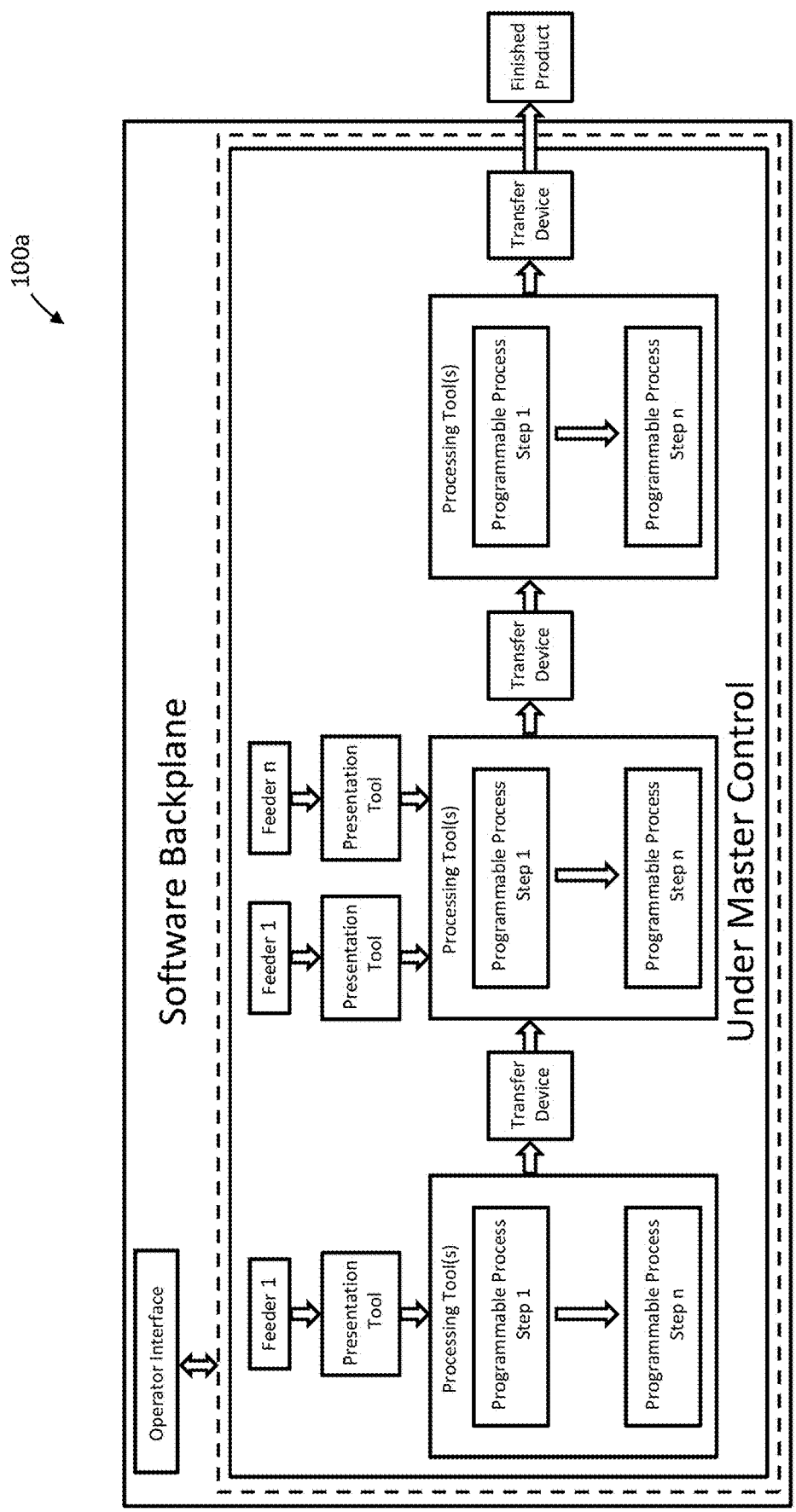
FIG. 3 is a schematic of an example implementation of the system of FIG. 1.

Referring to FIG. 3, an example implementation 100a of the system 100 is shown schematically. The example system 100a can be configured to carry out steps from processes disclosed herein. System 100a can receive workpieces and/or raw materials as inputs; progressively add value to them via processing tools; and discharge them either as discrete finished products, as unfinished products, or as rejected scrap (i.e., defective products).

As shown in FIG. 3, system 100a can receive the workpieces and/or materials from one or more feeders (e.g. of a feed device including, for example, a supply carrier) for delivering workpieces and/or materials to another presentation tool (e.g. grippers of a part presentation robot). The delivery from the feeders can be done directly or via a respective buffer. Each presentation tool or transfer device of the system 100a can be numerically controlled and configured to deliver the materials and/or workpieces to one or more processing tools (e.g. of a processing device). Each processing tool can add value to a workpiece and/or material via one or more programmable process steps. A given processing tool can operate in parallel to and/or in series with one or more other processing tools and/or presentation tools. Once the workpiece passes through a final processing tool, it can be discharged either as a successfully completed and validated finished product, as an unfinished product, or as rejected scrap. Human interaction with system 100a can be through an operator interface.

The system can include validation stations including validation devices configured to conduct inspections, checks, and/or tests on one or more of the workpieces. In some examples, the validation stations can be located at, for example, one or more feeders, presentation tools, transfer devices, and/or processing tools. At these points, workpieces can be eliminated from the system as scrap if they do not meet one or more predetermined inspection criteria. Validation stations can be configured to conduct inspection, check, and/or test operations on one or more of workpieces that can be electronically synchronized with other devices, such as, for example, a master device of the production devices 110.

The various elements described above can be controlled at least in part by software resources known as base software backplane. The backplane can be configured to permit various elements of the system to carry out various control functions including: management of inputs and outputs; management of local control tasks, including programmable process steps within processing tools and local inspection tasks within validation stations; communications between different elements in the system and communication with a human user via the operator interface.

The system 100a can include a numerically synchronized control architecture. In various embodiments, the feeders, presentation tools, processing tools, and transfer devices can be numerically controlled. Movement of workpieces and materials through the system can occur along programmable axes of motion, which can be either rotary or linear. Movement of tooling associated with the programmable process steps of processing tools can also take place along programmable linear and/or rotary axes of motion.

Figure 4:
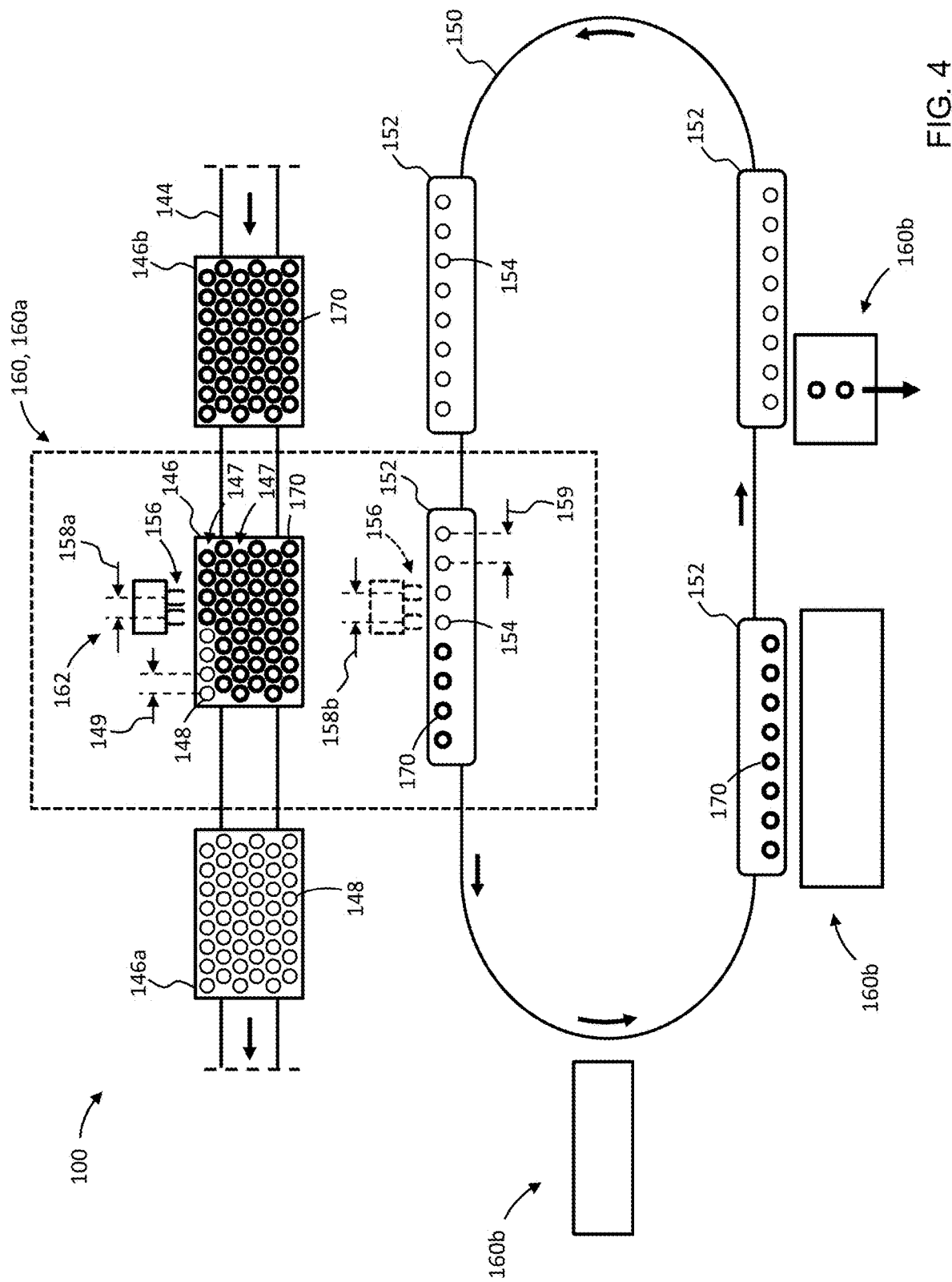
FIG. 4 is a schematic showing an example arrangement of a plurality of processing stations of the system of FIG. 1.

Referring to FIG. 4, an example arrangement of production devices of the system 100 is shown schematically. In the example illustrated, the system 100 includes a supply track 144 and a plurality of supply carriers 146 advanceable along the supply track 144. In the example illustrated, each supply carrier 146 comprises a tray including a plurality of supply retainers 148 for holding corresponding workpieces 170 for supply to the system 100. In the example illustrated, each of the supply retainers 148 are identical in size and shape, and each of the workpieces 170 are identical in size and shape.

In the illustrated example, the system 100 includes a processing track 150 adjacent the supply track 144 and supporting a plurality of processing carriers 152. Each processing carrier 152 comprises a pallet including a plurality of processing retainers 154 for holding corresponding workpieces 170, and is movable along the track 150 (e.g. through one or more servo-drives) among a plurality of processing stations 160. In the example illustrated, each of the processing retainers 154 are identical in size and shape.

Each supply carrier 146 has a quantity of supply retainers 148 and each processing carrier 152 has a quantity of processing retainers 154. The quantity of supply retainers 148 can be at least ten times greater than the quantity of processing retainers 154. In the example illustrated, each supply carrier has 140 supply retainers for holding 140 corresponding workpieces 170, and each processing carrier 152 has seven processing retainers 154 for holding seven corresponding workpieces 170.

Each processing station 160 includes one or more production devices operable in electronic synchronization with each other, the carriers 152, and/or production devices of other processing stations 160 for processing the workpieces 170. In the example illustrated, the processing stations 160 shown in FIG. 4 include a first processing station in the form of a workpiece repitch station 160a for unloading workpieces 170 from corresponding supply retainers 148 arranged at a first pitch 149 in a supply carrier 146 (e.g. by gripping the workpieces with repitch grippers 156 of a repitch robot 162), adjusting the workpieces 170 from the first pitch 149 to a second pitch 159 (e.g. by translating the grippers 156 relative to each other from a first spacing 158a corresponding to the first pitch 149 to a second spacing 158b corresponding to the second pitch 159), and loading the workpieces 170 into corresponding processing retainers 154 arranged at the second pitch 159 in a processing carrier 152 (e.g. by positioning and releasing the workpieces in corresponding retainers 154 via the grippers 156). The second pitch 159 is different from the first pitch 149, and in the example illustrated, the second pitch 159 is greater than the first pitch 149.

A plurality of subsequent processing station 160b are provided along the processing track 150 for performing subsequent value-added operations on the workpieces held by the processing carrier 152; validating, testing, and/or inspecting (and/or performing some other operation on) the workpieces; and/or removing the workpieces from the processing carrier for discharge from the system, either as a successfully completed and validated finished product, as an unfinished product, or as a rejected defective product.

Figure 5A:
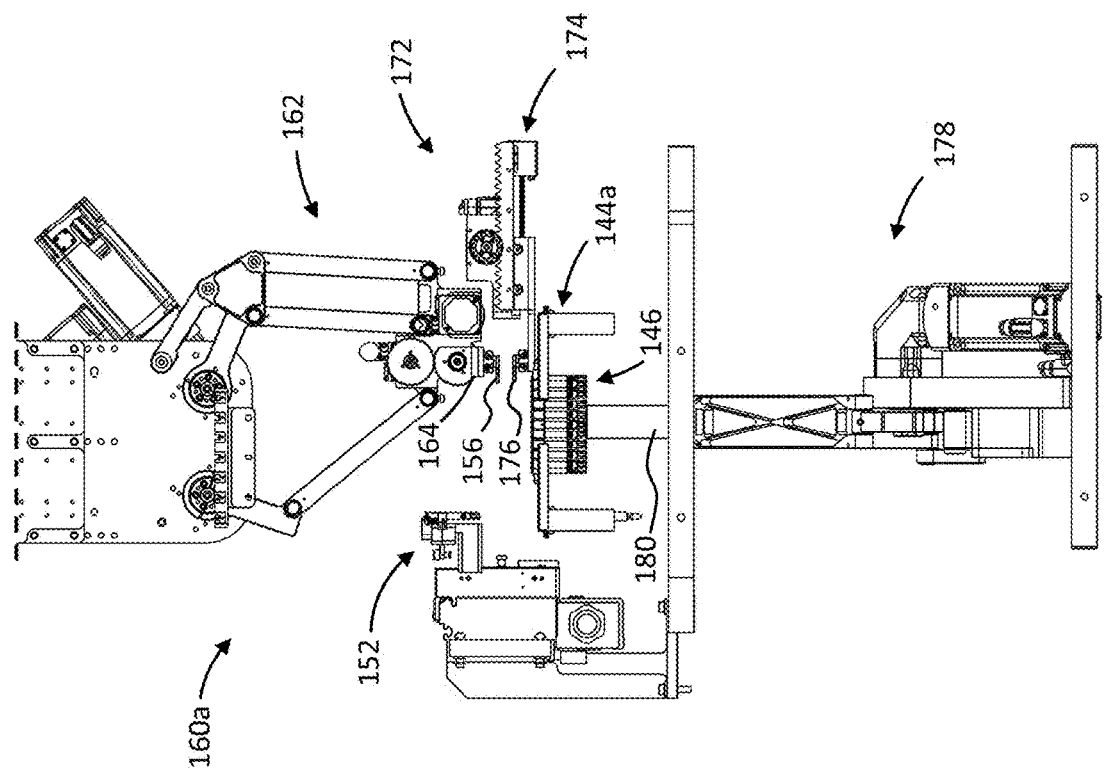
FIG. 5A is an elevation view of the repitch station of FIG. 5.
Figure 5:
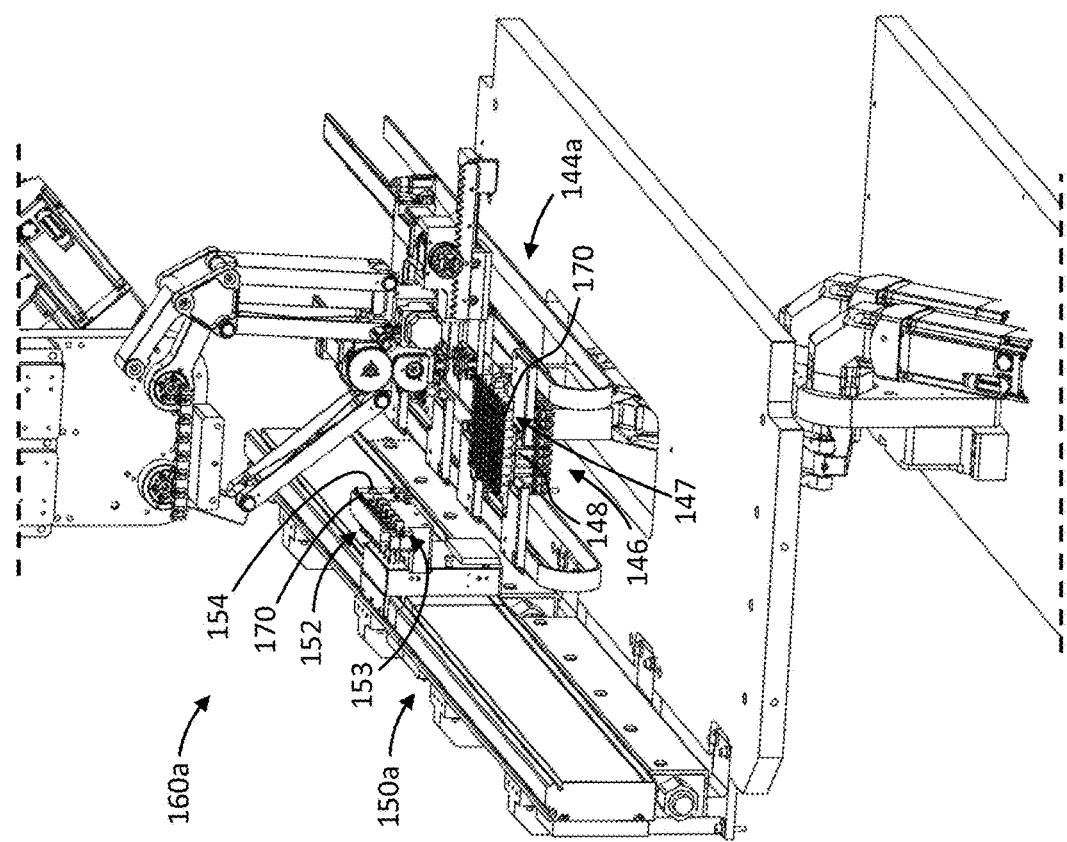
FIG. 5 is a perspective view of a workpiece repitch station of the system shown in FIG. 4.

Referring to FIGS. 5 and 5A, a more detailed view of portions of an example repitch station 160a is shown. In the example illustrated, a supply track section 144a of the supply track 144 (FIG. 4) passes through the repitch station 160a. The supply carriers 146 are advanceable along the supply track section 144a to an unloading location therealong. Each supply carrier 146 includes at least one row 147 of supply retainers 148. In the example illustrated, each supply carrier 146 includes a plurality of adjacent rows 147 of supply retainers 148 (twenty rows of seven supply retainers each, in the example illustrated), and each row 147 extends generally parallel with the supply track section 144a. The supply retainers 148 are positioned along each row 147 at regular intervals defined by the first pitch 149 (FIG. 4), and the supply retainers 148 hold corresponding workpieces 170 at the first pitch 149. In the example illustrated, the workpieces 170 are generally cylindrical, and the supply retainers 148 in adjacent rows 147 are offset from each other by about half of the first pitch. This can permit the workpieces in adjacent rows to be positioned in a staggered arrangement and can help increase workpiece density in the supply carrier 146.

In the example illustration, a processing track section 150a of the processing track 150 (FIG. 4) passes through the repitch station 160a, and is arranged in (and extends) parallel with the supply track section 144a. The processing carriers 152 are advanceable along the processing track section 150a to a loading location therealong. Each processing carrier 152 has at least one row 153 of processing retainers 154 for receiving corresponding workpieces 170. In the example illustrated, each processing carrier 152 has a single row 153 of seven processing retainers 154, and the row 153 of processing retainers 154 extends parallel with the processing track section 150a. The processing retainers 154 are positioned along the row 153 at regular intervals defined by the second pitch 159 (FIG. 4).

Referring to FIG. 5A, in the example illustrated, the repitch robot 162 has an end-of-arm tooling (EOAT) platform 164 to which the repitch grippers 156 are movably mounted. In the example illustrated, the repitch grippers 156 are moveable together (in unison through movement of the EOAT platform 164) between a pick-up position (see FIG. 9) adjacent the unloading location for removing a set of workpieces 170 from adjacent supply retainers 148 at the unloading location, and a drop-off position (see FIG. 12) adjacent the loading location for loading the set of workpieces 170 into adjacent processing retainers 154 at the loading location. The repitch grippers 156 are translatable relative to each other between a pick-up configuration and a drop-off configuration. When in the pick-up configuration, the repitch grippers 156 are spaced apart from each other by the first spacing 158a (FIG. 4). The first spacing 158a corresponds to the first pitch 149 for alignment of the repitch grippers 156 (when in the pick-up position) with corresponding supply retainers 148 at the unloading location to facilitate removal of the set of workpieces 170 from the supply retainers 148. When in the drop-off configuration, the repitch grippers 156 are spaced apart from each other by the second spacing 158b (FIG. 4). The second spacing 158b corresponds to the second pitch 159 for alignment of the repitch grippers 156 (when in the drop-off position) with corresponding processing retainers 154 at the loading location to facilitate loading of the set of workpieces 170 into the processing retainers 154.

In the example illustrated, the repitch robot 162 includes a pair of the repitch grippers 156. In the example illustrated, the repitch grippers 156 are translatable relative to each other between the first and second spacing 158a, 158b along a repitch axis fixed relative to the EOAT platform 164 through operation of one or more servo-drives of the repitch robot 162. In the example illustrated, the repitch axis extends generally parallel with the supply and processing track sections 144a, 150a (and the rows 147, 153 of supply and processing retainers). In the example illustrated, each repitch gripper 156 has a pair of fingers 168 (FIG. 11) moveable relative to each other between a closed position for gripping corresponding workpieces 170 and an open position for receiving and releasing corresponding workpieces 170.

In the example illustrated, the repitch robot 162 is in the form of a pick-and-place robot, and the EOAT platform 164 is movable in a vertical plane perpendicular to the supply and processing track sections 144a, 150a. In the example illustrated, the pick-up position for the grippers 156 is adjustable to any one of a plurality pick-up locations. Each pick-up location is adjacent a corresponding row 147 of the supply retainers 148 of the supply carrier 146 (when at the unloading location) for unloading workpieces from that corresponding row 147 (e.g. after depletion of all workpieces 170 from a preceding row).

Referring to FIG. 5A, in the example illustrated, the repitch station 160a further includes a workpiece presentation system 172 for presentation of the set of workpieces 170 to the repitch grippers 156 to facilitate transfer of the workpieces 170 from the supply retainers 148 to the grippers 156. In the example illustrated the workpiece presentation system 172 is configured to raise the set of workpieces 170 from corresponding supply retainers 148 at the unloading location relative to the supply carrier 146 for presentation to the repitch grippers 156 to facilitate transfer thereto.

In the example illustrated, the workpiece presentation system 172 includes a workpiece presentation robot 174 having a plurality of presentation grippers 176 operable to hold the set of workpieces 170 at the unloading location in fixed vertical relation relative to the supply track section 144a. The workpiece presentation system 172 further includes a carrier handling robot 178 having an end effector 180 operable to engage and raise the supply carrier 146 at the unloading location above the supply track section 144a for vertical alignment of the set of workpieces 170 with the presentation grippers 176 for engagement therebetween, and to lower the supply carrier 146 relative to the presentation grippers 176 to raise the set of workpieces 170 relative to the supply carrier 146 for presentation to the repitch grippers 156.

In the example illustrated, the presentation robot 174 is in the form of a single axis linear robot, and the presentation grippers 176 are translatable along a horizontal axis perpendicular to the supply track section 144a between a retracted position (see FIG. 10) clear of the supply carrier 146, and at least one advanced position (see FIG. 9) for gripping the set of workpieces 170 when in vertical alignment with the presentation grippers 176. The end effector 180 of the carrier handling robot 178 is translatable vertically from a first position (see FIG. 6), in which the end effector 180 is below and clear of the supply carrier 146 to permit translation of the supply carrier 146 along the supply track 150, to a second position (see FIG. 7) above the first position for lifting the supply carrier 146 and the set of workpieces 170 into vertical alignment with the presentation grippers 176. The end effector 180 of the carrier handling robot 178 is further translatable vertically from the second position to a third position (see FIG. 9) between the first and second positions for lowering the supply carrier 146 relative to the presentation grippers 176 to raise the workpieces 170 held by the presentation grippers 176 relative to the supply carrier 146 for presentation to the repitch grippers 156. In the example illustrated, the end effector 180 is further translatable horizontally relative to the supply track section 144a along an indexing axis for moving the supply carrier 146 among a plurality of supply indexing positions. In the example illustrated, the indexing axis is parallel with the supply track section 144a, and each supply indexing position corresponds to a respective set of supply retainers 148 being in alignment with the pick-up position for the repitch grippers 156.

An example method of repitching workpieces at the repitch station 160a will now be described with reference to FIGS. 6 to 15. In the example illustrated, the control systems 120, 220 are configured to electronically synchronize operation of the supply carriers 146, processing carriers 152, repitch robot 162, and workpiece presentation system 172 to carry out the methods described herein for repitching and processing the workpieces 170.

Figure 6:
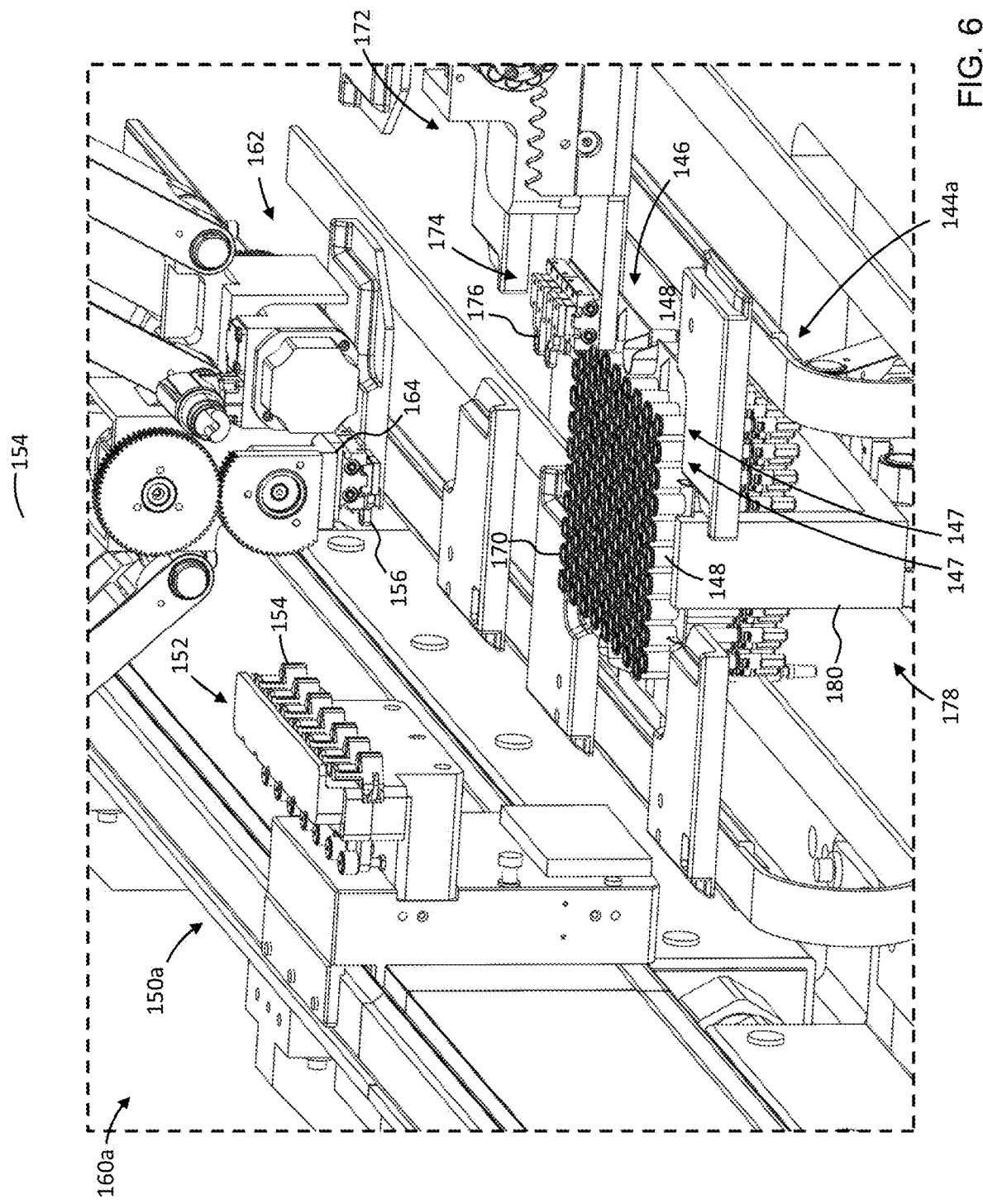
FIGS. 6 to 15 show example process steps for repitching workpieces using the station of FIG. 5.

Referring to FIG. 6, an initial supply carrier 146 is advanced along the supply track section 144a and received at the repitch station 160a. An initial processing carrier 152 is advanced along the processing track section 150a and received at repitch station 160a.

Figure 7:
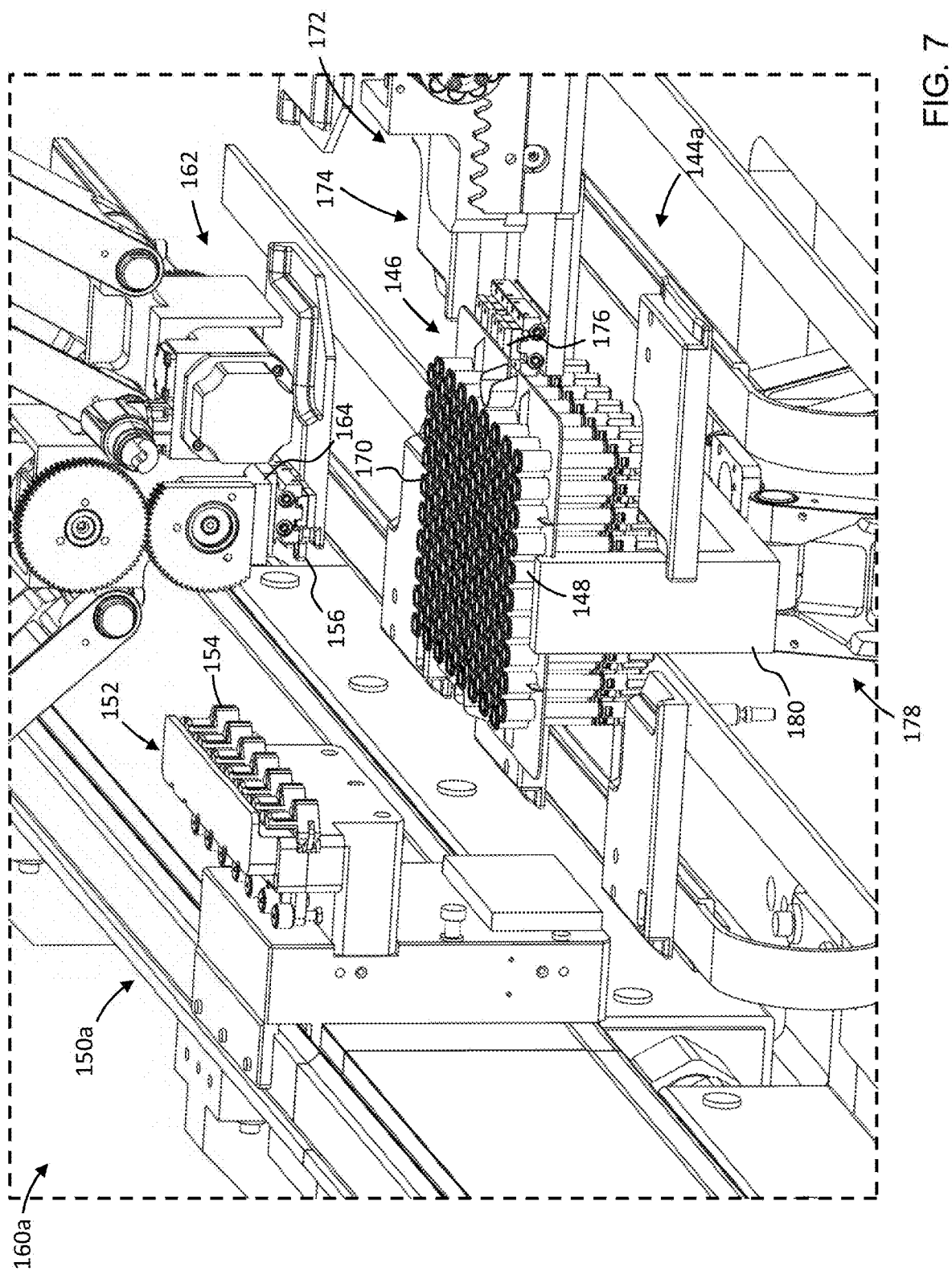
Figure 8:
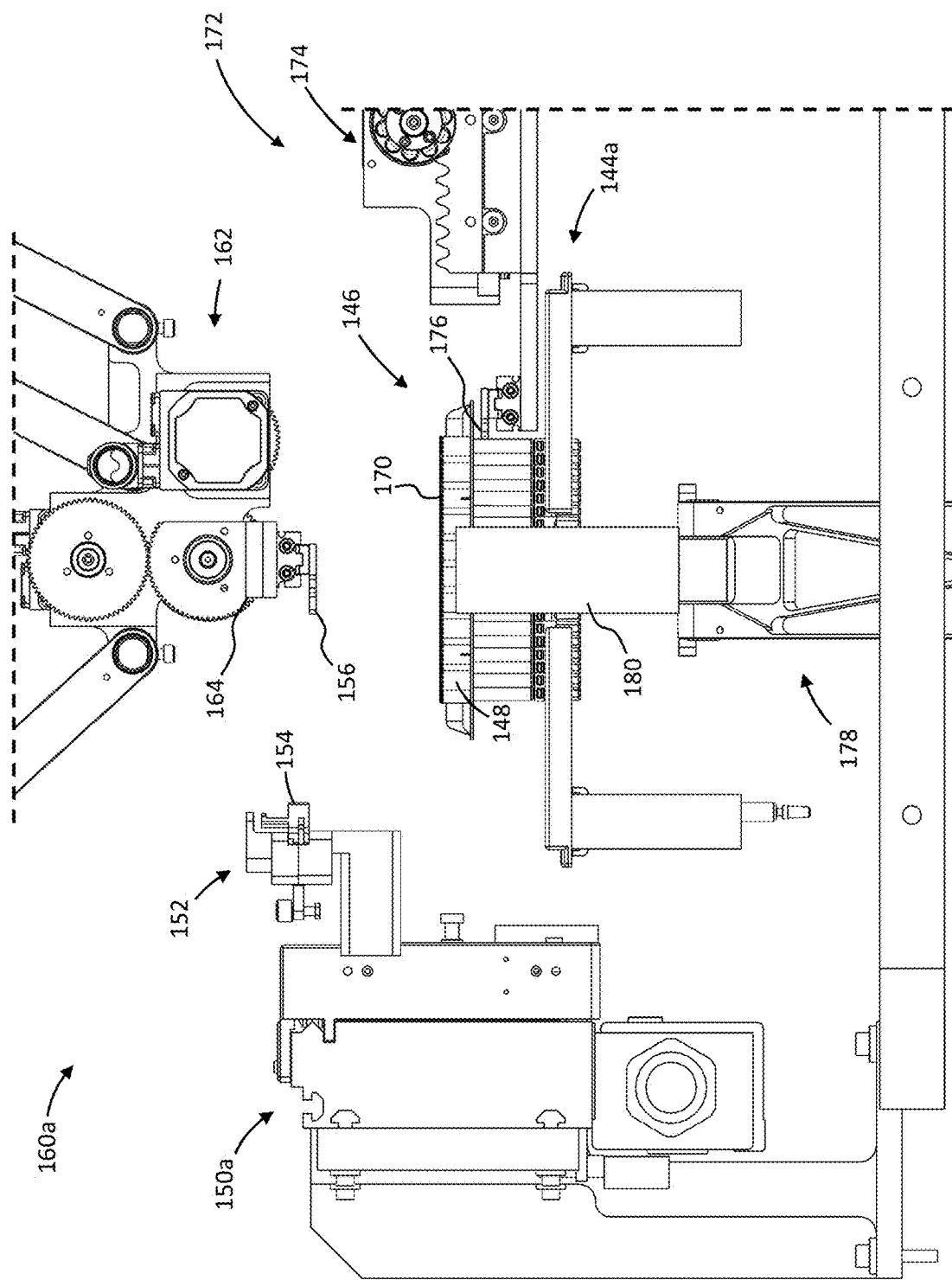
Figure 9:
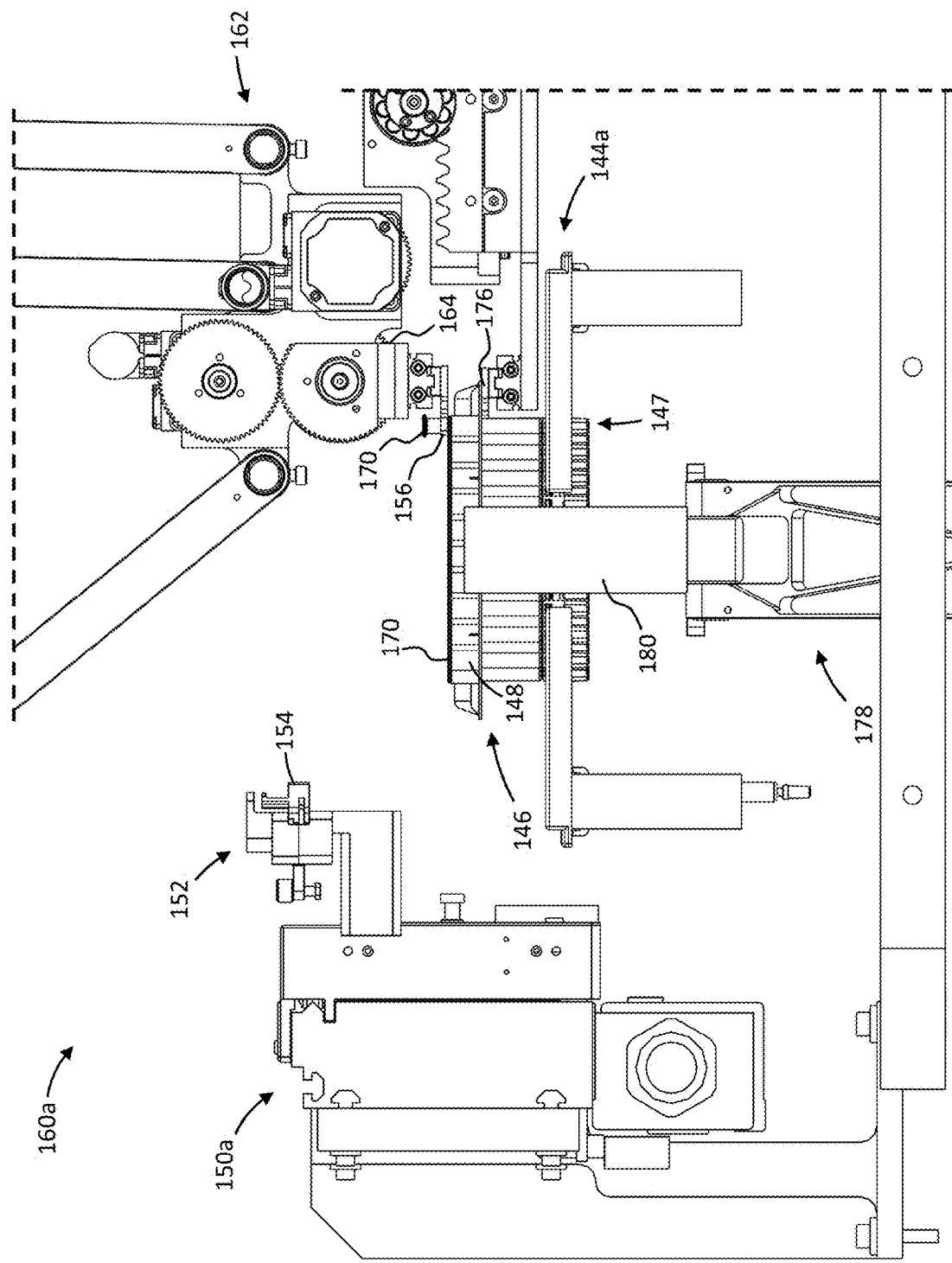

Referring to FIG. 7, the supply carrier 146 is lifted relative to the presentation grippers 176 (via the end effector 180) to bring a lower surface of an initial set of workpieces 170 into vertical alignment with the presentation grippers 176. Referring to FIG. 8, the presentation grippers 176 are translated horizontally from the retracted position clear of the supply carrier 146 to the advanced position for gripping of the lower surface of corresponding workpieces in alignment with the presentation grippers 176. Referring to FIG. 9, while the lower surface of each workpiece 170 of the initial set is gripped by a corresponding presentation gripper 176, the supply carrier 146 is lowered relative to the set of workpieces 170 being gripped by the presentation grippers 176. This raises the set of workpieces 170 relative to the supply carrier 146 to present (e.g. expose) an upper surface of each workpiece 170 of the set of workpieces to the repitch grippers 156.

Figure 10:
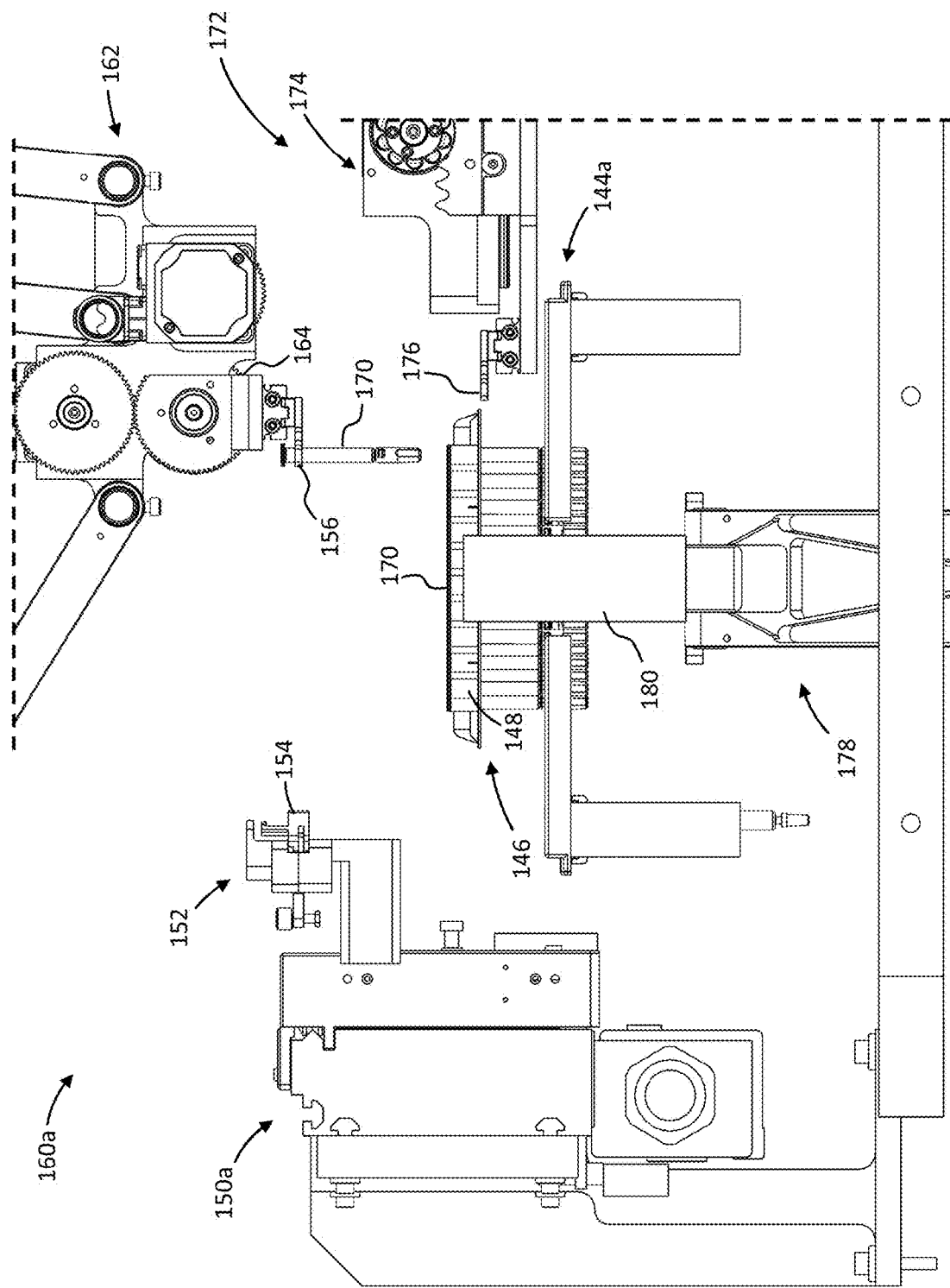

Still referring to FIG. 9, the repitch grippers 156 are adjusted to the pick-up configuration and moved to the unloading position to position the repitch grippers 156 in alignment with the initial set of workpieces 170 in an initial row 147 of the supply carrier 146. The repitch grippers 156 grip the upper surface of corresponding workpieces 170 of the initial set, and the presentation grippers 176 release the lower surface of the workpieces 170 and are moved back toward the retracted position. Referring to FIG. 10, after the presentation grippers 176 release the lower surface of the workpieces 170, the repitch grippers 156 lift the initial set of workpieces 170 out of and away from corresponding supply retainers 148.

Figure 11:
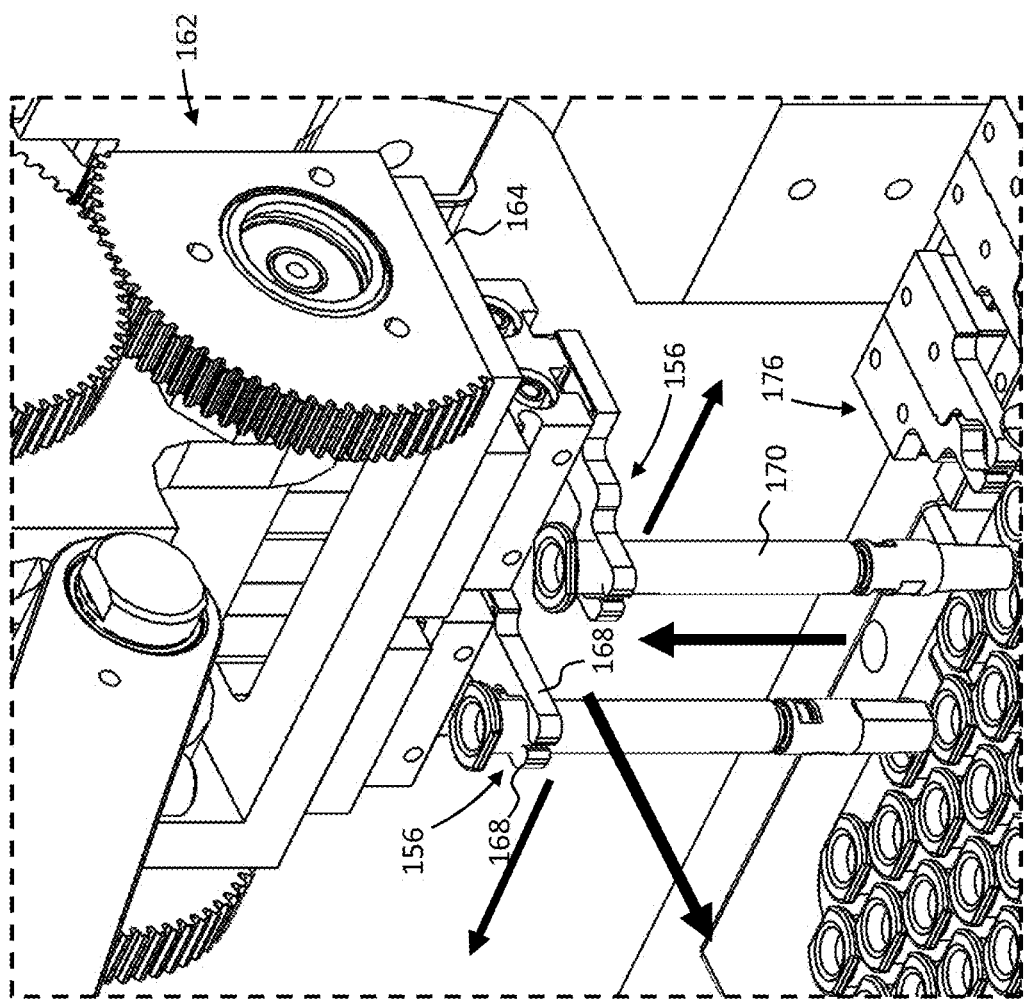
Figure 12:
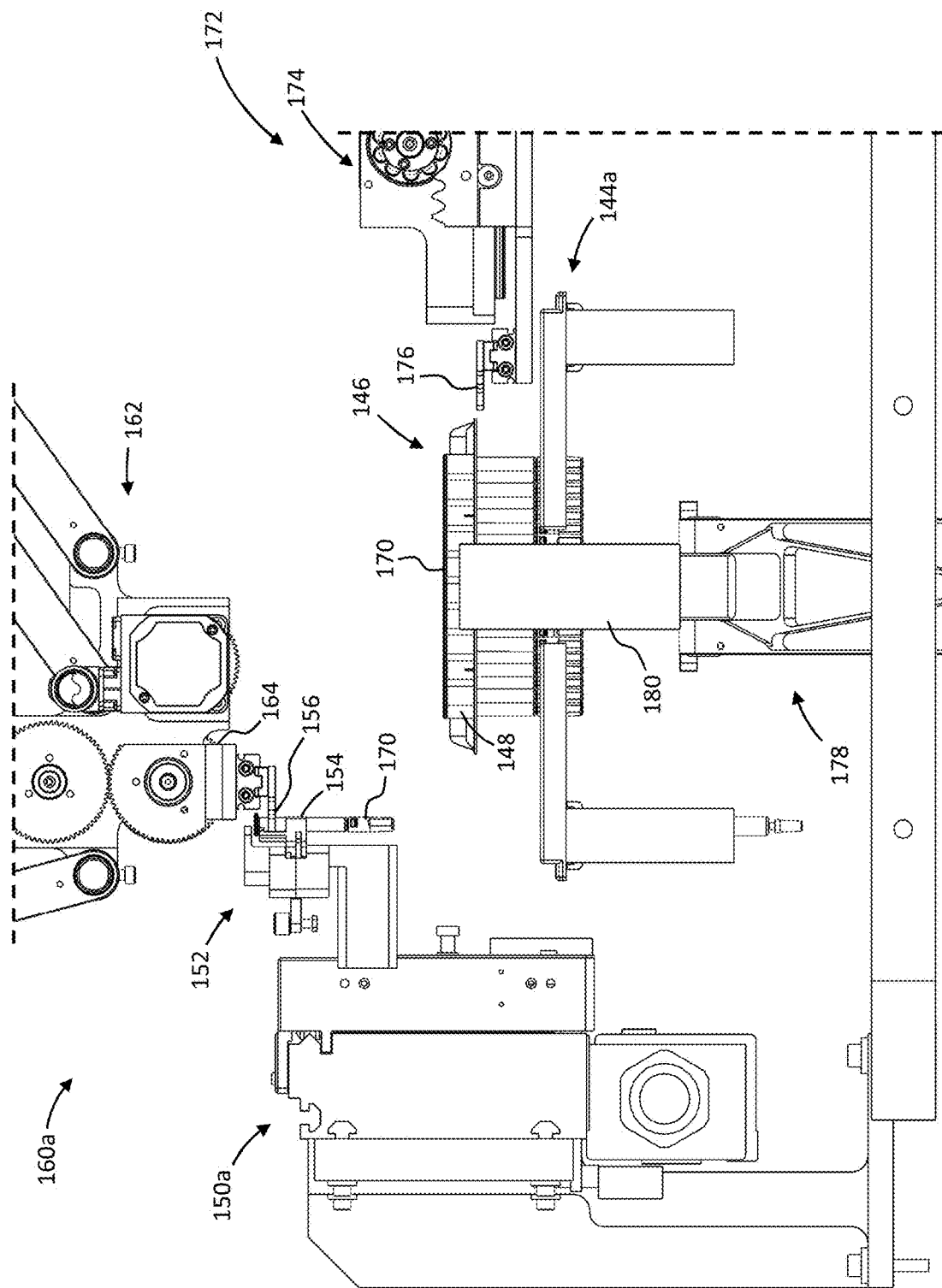

Referring to FIGS. 11 and 12, after transfer of the initial set of workpieces 170 to the repitch grippers 156, the repitch grippers 156 are moved to the drop-off position, and translated relative to each other from the pick-up configuration to the drop-off configuration for spacing the initial set of workpieces 170 from the first pitch 149 (FIG. 4) to the second pitch 159 (FIG. 4) to facilitate loading of the workpieces 170 into adjacent processing retainers 154 of the processing carrier 152. In the example illustrated, adjustment of the repitch grippers 156 from the pick-up configuration to the drop-off configuration is performed during (and in electronic synchronization) with movement of the repitch grippers 156 from the pick-up position to the drop-off position. With the repitch grippers 156 in the drop-off configuration, the initial set of workpieces 170 are positioned into corresponding adjacent processing retainers 154 and released by the repitch grippers 156 for transfer from the repitch grippers 156 to corresponding processing retainers 154.

Figure 13:
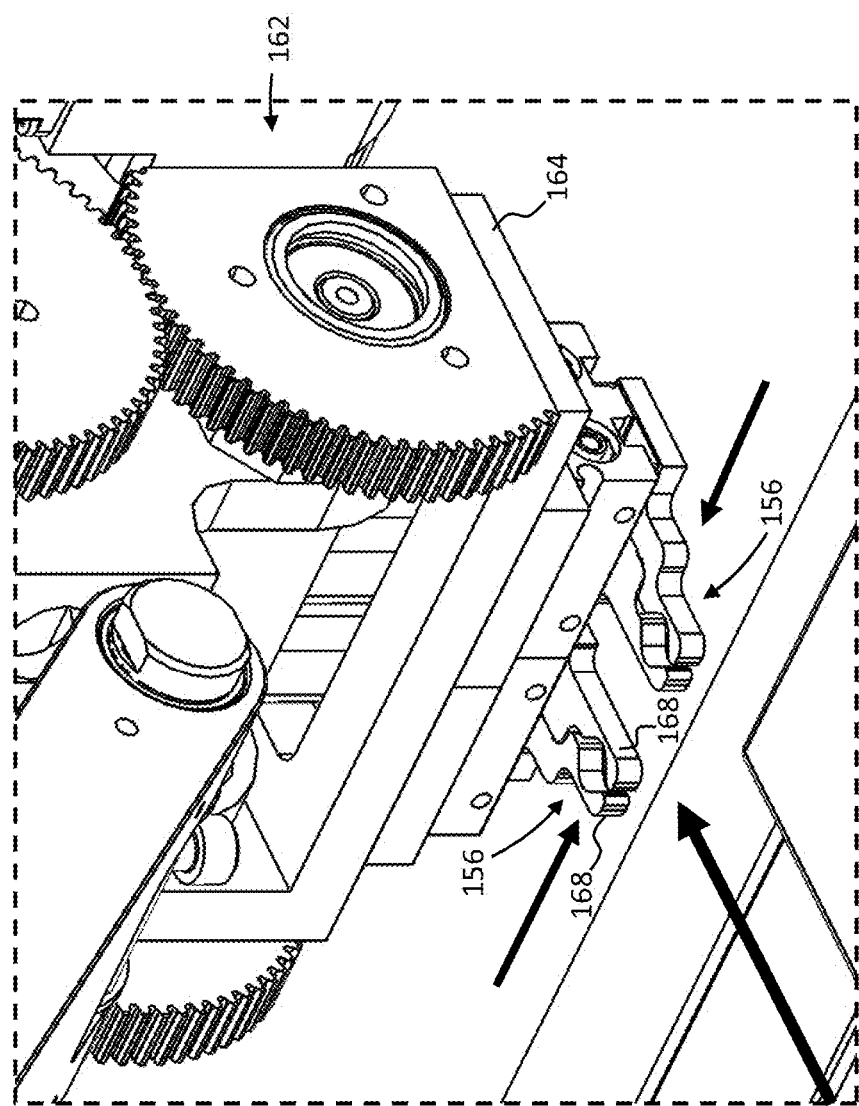

Referring to FIG. 13, after transfer of the initial set of workpieces 170 to the processing carrier 152, the repitch grippers 156 are moved from the drop-off position back to the pick-up position, and translated relative to each other from the drop-off configuration to the pick-up configuration in preparation for unloading of a subsequent set of workpieces 170 from corresponding supply retainers 148. In the example illustrated, adjustment of the repitch grippers 156 relative to each other from the drop-off configuration to the pick-up configuration is performed during (and in electronic synchronization) with movement of the repitch grippers 156 from the drop-off position to the pick-up position.

The repitch and transfer process is repeated continuously in successive repitch cycles for subsequent sets of workpieces, supply retainers, and processing retainers. After transfer of the initial set of workpieces 170 from the initial set of supply retainers 148 to the repitch grippers 156 in an initial cycle, the supply carrier 146 is indexed to position a subsequent set of supply retainers 148 into alignment with the pick-up position for the repitch grippers 156 for a subsequent cycle. In the example illustrated, the supply carrier 146 is indexed through movement of the end effector 180 of the carrier handling robot 178 along the indexing axis.

Figure 14:
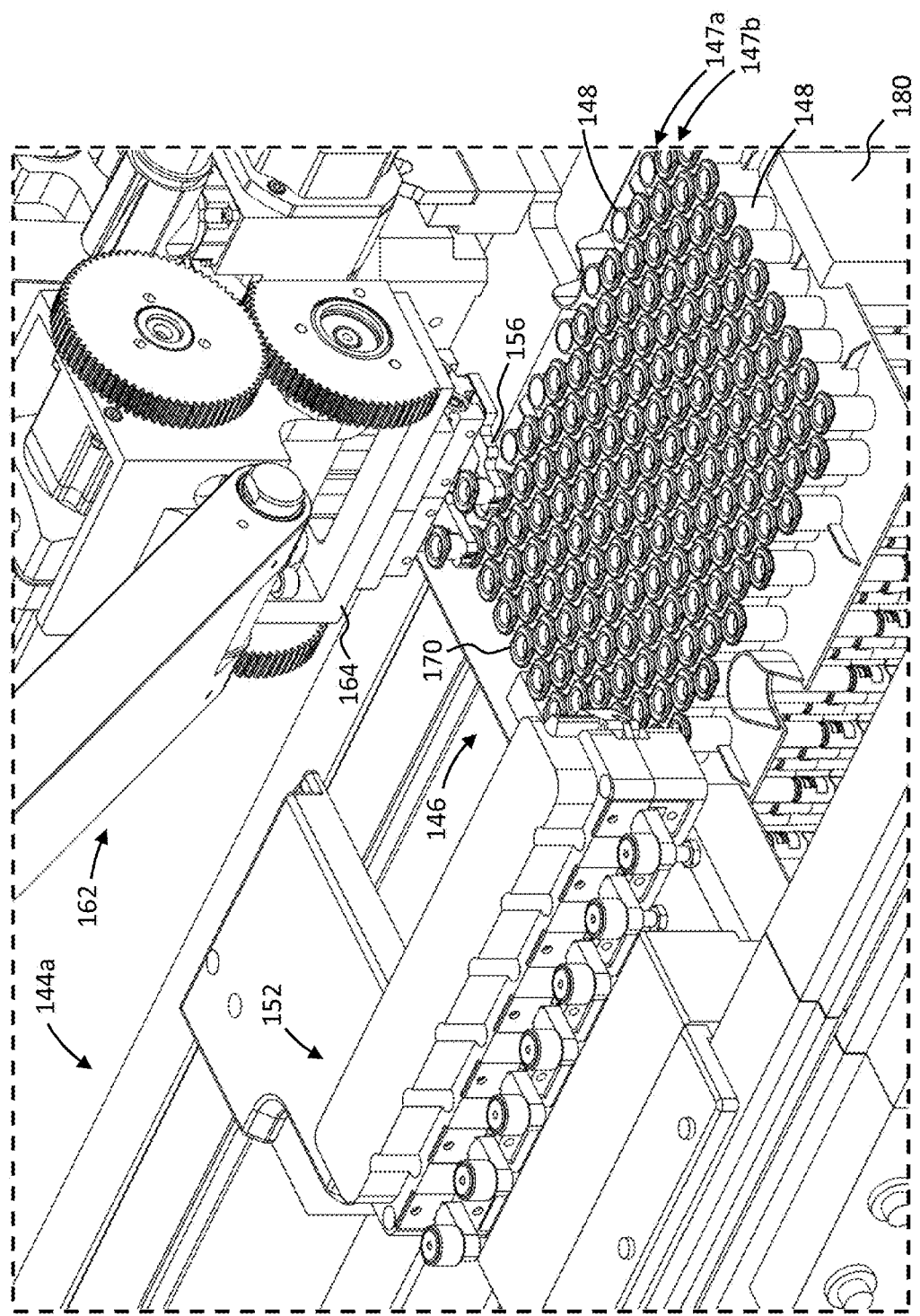

Referring to FIG. 14, in an initial plurality of repitch cycles, the pick-up position for the repitch grippers 156 is adjacent an initial row 147*a* of supply retainers 148 for unloading workpieces 170 from the initial row 147. After all of the workpieces 170 are unloaded from the initial row 147*a*, the pick-up position is adjusted toward a subsequent, adjacent row 147*b* of supply retainers 148 for unloading workpieces from the subsequent row 147*b* in a subsequent plurality of repitch cycles. This is repeated for each of the rows 147 of the supply carrier 146 until the supply carrier 146 is emptied of workpieces 170. A similar adjustment is performed for the advanced position of the presentation grippers 176 for each row 147.

Figure 15:
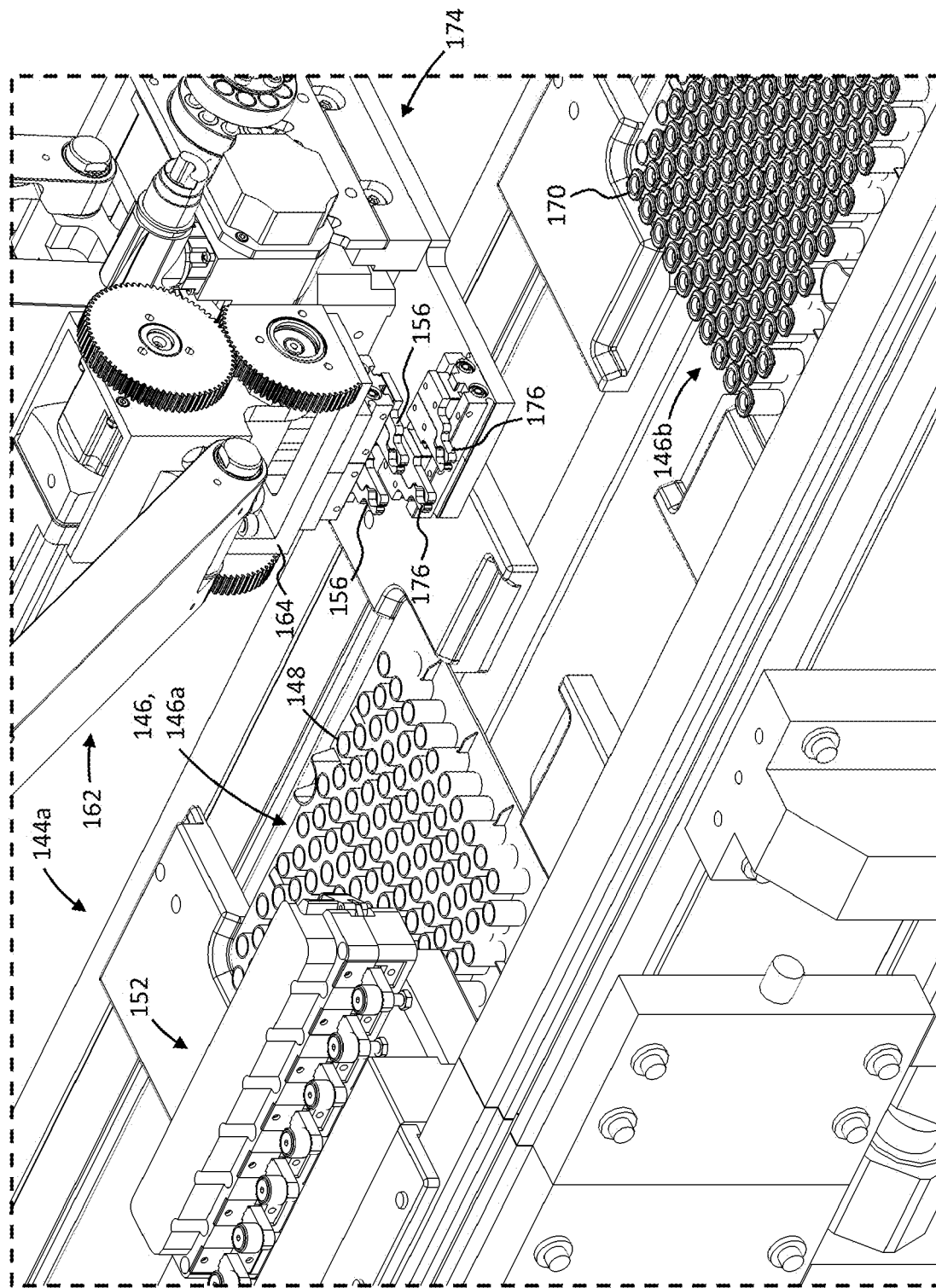

Referring to FIG. 15, after all the workpieces are unloaded from the supply carrier 146 to produce an empty supply carrier 146*a*, the empty supply carrier 146*a* is replaced with a full supply carrier 146*b* for subsequent cycles. The empty supply carrier 146*a* is replaced by advancing the empty supply carrier 146*a* along the supply track section 144*a* away from the repitch station 160*a* and advancing the next, full supply carrier 146*b* along the supply track section 144*a* to the repitch station 160*a* for positioning at the unloading location.

Similarly, after transfer of the initial set of workpieces 170 from the repitch grippers 156 to corresponding processing retainers 154 in the initial cycle, the processing carrier 152 is indexed to position a subsequent set of processing retainers 154 in alignment with the drop-off position of the repitch grippers 156 for a subsequent cycle. In the example illustrated, the processing carrier 152 is indexed through advancement along the processing track section 150*a*.

Referring to FIG. 4, after each processing retainer 154 of the processing carrier 152 has received a corresponding workpiece 170 to produce a full processing carrier, the full processing carrier is replaced with an empty processing carrier for subsequent cycles. Replacing the full processing carrier includes advancing the full processing carrier along the processing track section 150*a* away from the repitch station 160*a* and advancing the empty processing carrier along the processing track section 150*a* to the repitch station 160*a*.

The invention claimed is:

1. A method of repitching workpieces in an automated mass production system, comprising:
   a) receiving a supply carrier at a workpiece repitch station, the supply carrier including at least one row of supply retainers, the supply retainers positioned along each row at regular intervals defined by a first pitch, and each supply retainer holding a corresponding workpiece for unloading at the repitch station;
   b) receiving a processing carrier at the repitch station, the processing carrier including at least one row of processing retainers for receiving corresponding workpieces, the processing retainers positioned along each row at regular intervals defined by a second pitch, the second pitch different from the first pitch;
   c) transferring a set of workpieces from adjacent supply retainers in a corresponding row of the supply carrier to corresponding repitch grippers of a repitch robot at the repitch station, including, prior to engagement of the set of workpieces by the repitch grippers, raising the set of workpieces relative to the supply carrier to present an upper surface of each workpiece of the set of workpieces to the repitch grippers;
   d) transferring the set of workpieces from the repitch grippers to adjacent processing retainers in a corresponding row of the processing carrier; and
   e) after (c) and prior to (d): moving the repitch grippers from a pick-up position adjacent the supply carrier to a drop-off position adjacent the processing carrier, and translating the repitch grippers relative to each other from a pick-up configuration, in which adjacent repitch grippers are spaced apart from each other by a first spacing, to a drop-off configuration, in which adjacent repitch grippers are spaced apart from each other by a second spacing, the first spacing corresponding to the first pitch for alignment of the repitch grippers in the pick-up position with corresponding supply retainers to facilitate the transferring in (c), and the second spacing corresponding to the second pitch for alignment of the repitch grippers in the drop-off position with corresponding processing retainers to facilitate the transferring in (d).

2. The method of claim 1, wherein the translating in (e) is performed during the moving in (e).

3. The method of claim 1, further comprising, after the transferring in (d): (f) moving the repitch grippers from the drop-off position to the pick-up position, and translating the repitch grippers relative to each other during movement toward the pick-up position from the drop-off configuration to the pick-up configuration in preparation for step (c) of a subsequent repitch cycle.

4. The method of claim 3, further comprising continuously repeating steps (c) to (f) in successive repitch cycles for subsequent sets of workpieces, supply retainers, and processing retainers.

5. The method of claim 4, wherein during (c) in an initial cycle, the set of supply retainers are in alignment with the pick-up position of the repitch grippers, and the method further comprises, after (c) in the initial cycle, indexing the supply carrier to position a subsequent set of supply retainers in alignment with the pick-up position of the repitch grippers.

6. The method of claim 5, wherein the supply carrier is held by an end effector of a carrier handling robot at the repitch station, and the indexing step includes moving the end effector along an indexing axis to translate the supply carrier therealong.

7. The method of claim 5, wherein during (c) in an initial plurality of cycles, the pick-up position is adjacent an initial row of supply retainers for unloading workpieces from the initial row, and after unloading the workpieces from the supply retainers in the initial row, the pick-up position is adjusted toward a subsequent row of supply retainers for unloading workpieces from the subsequent row in a subsequent plurality of cycles.

8. The method of claim 4, further comprising, after unloading all the workpieces from the supply carrier to produce an empty supply carrier, replacing the empty supply carrier with a full supply carrier for subsequent cycles.

9. The method of claim 8, wherein step (a) includes advancing the supply carrier along a supply track section passing through the repitch station, and the replacing step includes advancing the empty supply carrier along the supply track section away from the repitch station and advancing the full supply carrier along the supply track section to the repitch station.

10. The method of claim 4, wherein during (d) in an initial cycle, the set of processing retainers are in alignment with the drop-off position for the repitch grippers, and the method further comprises, after (d) in the initial cycle, indexing the processing carrier to position a subsequent set of processing retainers in alignment with the drop-off position for the repitch grippers.

11. The method of claim 10, wherein the indexing step comprises translating the processing carrier along a processing track.

12. The method of claim 4, further comprising, after transferring workpieces into each processing retainer of the processing carrier to produce a full processing carrier, replacing the full processing carrier with an empty processing carrier for subsequent cycles.

13. The method of claim 12, wherein step (b) includes advancing the processing carrier along a processing track section passing through the repitch station, and the replacing step includes advancing the full processing carrier along the processing track section away from the repitch station and advancing the empty processing carrier along the supply track section to the repitch station.

14. The method of claim 1, wherein the repitch grippers are movably mounted to a common end-of-arm tooling (EOAT) platform of the repitch robot and translatable relative to each other along the EOAT platform between the first and second spacing.

15. The method of claim 1, wherein the raising step includes gripping a lower surface of each workpiece of the set of workpieces with corresponding presentation grippers of a workpiece presentation robot at the repitch station, and lowering the supply carrier relative to the set of workpieces gripped by the presentation grippers.

16. The method of claim 15, wherein (c) includes lifting the supply carrier relative to the presentation grippers to bring the lower surface into vertical alignment with the presentation grippers, and horizontally translating the presentation grippers from a retracted position clear of the supply carrier to an advanced position for gripping of the lower surface in vertical alignment with the presentation grippers.

17. A method of repitching workpieces in an automated mass production system, comprising:
 a) unloading a set of workpieces from a plurality of corresponding first retainers arranged at a first pitch, the unloading step including gripping of the workpieces by corresponding grippers of a repitch robot, and prior to engagement of the workpieces by the grippers of the repitch robot, raising the set of workpieces relative to the first retainers to present an upper surface of each workpiece of the set of workpieces to the grippers of the repitch robot;
 b) adjusting the workpieces from the first pitch to a second pitch different from the first pitch, the adjusting step including translating the grippers relative to each other from a first spacing corresponding to the first pitch to a second spacing corresponding to the second pitch; and
 c) loading the workpieces into a plurality of corresponding second retainers arranged at the second pitch, the loading step including positioning and releasing the workpieces in the second retainers via the grippers.

18. A repitch station for an automated mass production system, comprising:
 a) a supply track section;
 b) a plurality of supply carriers advanceable along the supply track section to an unloading location, each supply carrier including at least one row of supply retainers, the supply retainers positioned along each row at regular intervals defined by a first pitch, and each supply retainer for holding a corresponding workpiece;
 c) a processing track section arranged in parallel with the supply track section;
 d) a plurality of processing carriers advanceable along the processing track section to a loading location, each processing carrier including at least one row of processing retainers for receiving corresponding workpieces, the processing retainers positioned along each row at regular intervals defined by a second pitch, the second pitch different from the first pitch; and
 e) a repitch robot including a plurality of repitch grippers moveable together between a pick-up position adjacent the unloading location for removing a set of workpieces from adjacent supply retainers at the unloading location, and a drop-off position adjacent the loading location for placing the set of workpieces into adjacent processing retainers at the loading location, the grippers translatable relative to each other between a pick-up configuration and a drop-off configuration, and when in the pick-up configuration, the repitch grippers are spaced apart from each other by a first spacing corresponding to the first pitch for alignment of the repitch grippers in the pick-up position with corresponding supply retainers at the unloading location to facilitate removal of the set of workpieces from the supply retainers, and when in the drop-off configuration, the repitch grippers are spaced apart from each other by a second spacing corresponding to the second pitch for alignment of the repitch grippers in the drop-off position with corresponding processing retainers at the loading location to facilitate loading of the set of workpieces into the processing retainers; and
 f) a workpiece presentation system configured to raise the set of workpieces from adjacent supply retainers at the unloading location relative to the supply carrier for presentation of an upper surface of each workpiece of the set of workpieces to the repitch grippers prior to engagement of the upper surface of the set of workpieces by the repitch grippers to facilitate transfer of the set of workpieces from the supply retainers to the repitch grippers.

* * * * *